United States Patent [19]
Nagasaka et al.

[11] Patent Number: 5,628,944
[45] Date of Patent: May 13, 1997

[54] METHOD AND APPARATUS FOR MOLDING TWO-COLOR POLYURETHANE PARTS BY RIM

[75] Inventors: Naohisa Nagasaka; Masayuki Goto; Shogo Sugiyama; Yukio Kawakita; Masanao Ishikake, all of Aichi, Japan

[73] Assignee: Toyoda Gosei Co., Ltd., Nishikasugai-gun, Japan

[21] Appl. No.: 364,445

[22] Filed: Dec. 27, 1994

Related U.S. Application Data

[63] Continuation-in-part of Ser. No. 117,678, Sep. 8, 1993, abandoned.

[30] Foreign Application Priority Data

Oct. 30, 1992 [JP] Japan .................................. 4-315845
Dec. 27, 1993 [JP] Japan .................................. 5-352752

[51] Int. Cl.$^6$ .................... B29C 44/06; B29C 67/20
[52] U.S. Cl. .......... 264/46.9; 264/45.5; 264/102; 264/240; 264/245; 264/328.6; 264/328.8; 425/4 R; 425/130; 425/173; 425/543; 425/546
[58] Field of Search .................. 264/240, 245, 264/328.2, 328.6, 328.8, 328.18, 328.19, 101, 102, 45.5, 46.9; 425/543, 546, 570, 571, 573, 4 R, 173, 130

[56] References Cited

U.S. PATENT DOCUMENTS

| | | |
|---|---|---|
| 3,865,915 | 2/1975 | Garner . |
| 3,883,629 | 5/1975 | Garner . |
| 3,970,732 | 7/1976 | Slaats et al. . |
| 5,464,582 | 11/1995 | Okano et al. .................. 264/45.5 |
| 5,476,619 | 12/1995 | Nakamura et al. ............. 264/45.5 |

FOREIGN PATENT DOCUMENTS

| | | |
|---|---|---|
| 0162130A1 | 11/1985 | European Pat. Off. . |
| 461522 | 12/1991 | European Pat. Off. . |
| 0594981A1 | 5/1994 | European Pat. Off. . |
| 3409402 | 9/1984 | Germany . |
| 3804619 | 8/1989 | Germany . |
| 3938891 | 5/1990 | Germany . |
| 56-111648 | 9/1981 | Japan . |
| 63-21110 | 1/1988 | Japan . |
| 1339445 | 12/1973 | United Kingdom . |
| WO88/00876 | 2/1988 | WIPO . |

OTHER PUBLICATIONS

European Search Report, Sep. 1, 1995.

*Primary Examiner*—Mathieu D. Vargot
*Attorney, Agent, or Firm*—Cushman Darby & Cushman, L.L.P.

[57] ABSTRACT

Provided is a method of making a multi-property polyurethane part by RIM having a surface layer and an interior layer. The surface layer and the interior layer have different properties. The pressure in the cavity of the mold is reduced and a surface forming RIM polyurethane material is injected into the evacuated cavity, whereby the surface layer of the molded part is formed by RIM. An interior forming RIM polyurethane material is injected into the evacuated cavity, whereby the interior of the molded part is also formed by RIM.

21 Claims, 16 Drawing Sheets

METHOD AND APPARATUS FOR MOLDING TWO-COLOR POLYURETHANE PARTS BY RIM

This application is a continuation-in-part of U.S. application Ser. No. 08/117,678, filed on Sep. 8, 1993, now abandoned.

BACKGROUND OF THE INVENTION

1. Field of the Invention

The present invention relates to a method of molding a polyurethane product which has variable physical properties, such as, different colors, hardness, etc., between the surface and inner layers. The invention also relates to a molding apparatus.

2. Description of Related Art

The conventional RIM technology for molding polyurethane parts includes applying a mold release agent to the surface of the mold cavity. If necessary, an insert is also set in the cavity of the mold. A RIM polyurethane material is, then injected into the cavity so that the respective components will react to cure. Then, the mold is opened and the molded part is removed.

Among these steps, the application of the mold release agent accounts for a large portion of the molding cycle and hence, it is an impediment to reducing the cycle time. Furthermore, the use of a single type of RIM polyurethane material makes it difficult to provide different properties in the surface and the interior layers of the molded part. Presently, the only way known is providing different blow ratios. It has been impossible to achieve various characteristics, such as a feeling of touch, and endurance without defects.

Although polyurethane molding by RIM is sometimes done after pigment-containing polyurethane materials (colorants) are applied to the surface of the mold cavity, such an application step is time-consuming.

SUMMARY OF THE INVENTION

An object of the present invention is to provide a novel method of molding multi-property polyurethane parts by RIM, such as, two-color parts having an interior layer covered with a thin surface layer.

Another object of the present invention is to provide a method and an apparatus for molding multi-property polyurethane parts by RIM at a significantly reduced equipment cost.

A further object of the invention is to provide a method and an apparatus for molding multi-property polyurethane parts by RIM, according to which a surface layer that is different from the interior layer in color, properties, etc. can be selectively formed at a desired site of the molded part.

The method of molding multi-property, such as two-color, polyurethane parts by RIM according to the present invention comprises filling the cavity of a mold under vacuum with a small amount of a surface forming RIM polyurethane material followed by filling the cavity with an interior forming RIM polyurethane material for subsequent molding by RIM. In a preferred embodiment, the surface forming RIM polyurethane material contains at least one auxiliary component different from the interior forming RIM polyurethane material. The auxiliary component can be, for example, selected from among a colorant, a mold release agent, or a catalyst such that different properties are attained by inclusion of the auxiliary component.

The present invention provides for incorporation of commonly used components in the surface forming operation such that the overall RIM process may be simplified. For example, if a mold release agent is incorporated in the surface layer forming operation, a separate step of applying the release agent can be omitted. If a desirable colorant is incorporated in the surface forming operation, a separate step of applying the colorant can be omitted. If a catalyst is incorporated in the surface forming operation, or if some other suitable component is adopted to provide different properties in the surface layer and the interior layer, the latitude in changing various characteristics such as a feeling of touch and endurance is significantly enhanced.

For selective injection of the two types of RIM polyurethane material, one for forming the surface layer and the other for forming the interior layer according to the present invention, one of the following methods, for example, can be employed.

(1) Using a three-component mixing head, the principal components, for example, a polyol component, an isocyanate component, and an auxiliary component, are delivered into a mixing chamber where they are mixed by impingement. The resulting mixture is injected in a small amount into a mold as the surface forming RIM polyurethane material. Then, the delivery of the auxiliary component is ceased and the polyol and isocyanate components are similarly mixed by impingement and injected into the mold as the interior forming RIM polyurethane material.

(2) Using a three-component mixing head, the passageway for a third component, which is one of the auxiliary components, is controlled in such a way that a fourth component, which is another auxiliary component, is charged into the exit portion of the mixing chamber. First, the principal components, for example, the polyol and isocyanate components, and the charged fourth component are delivered into the mixing chamber where they are mixed by impingement. The resulting mixture is then injected into a mold as the surface forming RIM polyurethane material. If there is no fourth component left, the third component will be delivered spontaneously. The three components, for example, the third component and the polyol as well as isocyanate components, are similarly mixed by impingement and then injected into the mold as the interior forming RIM polyurethane material.

(3) Using a four-component mixing head, the principal components, for example, the polyol and isocyanate components, and a fourth component, which is one of the auxiliary components, are delivered into the mixing chamber where they are mixed by impingement. The resulting mixture is injected in a small amount into the mold as the surface forming RIM polyurethane material. Then, the delivery of the fourth component is ceased and the polyol and isocyanate components as well as the third component, which is the other auxiliary component, are similarly mixed by impingement and injected into the mold as the interior forming RIM polyurethane material.

(4) By adjusting the pump delivery of the polyol or isocyanate component to the mixing head, the mixing ratio of the two principal components can be varied before they are injected successively as the surface or interior forming RIM polyurethane material.

(5) The method of molding a multi-property polyurethane part by RIM comprises the steps of: reducing the pressure in the cavity of a mold; injecting a small amount of a surface forming RIM polyurethane material into the evacuated cavity through a common gate for the mold from a head for mixing two surface-forming components, thereby RIM forming the surface of the part to be molded; and then injecting an interior forming RIM polyurethane material into the evacuated cavity through the common gate from a head for mixing two interior-forming components, thereby RIM forming the interior layer of the part to be molded.

This method can be implemented with an apparatus for a molding multi-property polyurethane part by RIM, which comprises a mold having a common gate that is open to the cavity, a head for mixing two surface-forming components that is connected to the common gate, a head for mixing two interior-forming components that is also connected to the common gate, and means for reducing the pressure in the cavity, such as a vacuum pump.

In this method and apparatus, the number of heads that can be used for mixing two surface-forming components is not limited to one, and two or more mixing heads can be used. Similarly, the number of heads that can be used for mixing two interior-forming components is not limited to one, and two or more mixing heads can be used. The number of common gates to be used is not limited to one, and two or more common gates can be used in such a way that they are respectively connected to the head for mixing two surface-forming components and to the head for mixing two interior-forming components.

(6) The method of molding a multi-property polyurethane part by RIM comprises the steps of: reducing the pressure in the cavity of a mold; injecting a small amount of a surface forming RIM polyurethane material into the evacuated cavity through a surface-forming gate on the mold from a head for mixing two surface-forming components, thereby RIM forming the surface of the part to be molded; and injecting an interior forming RIM polyurethane material into the evacuated cavity through an interior-forming gate from a head for mixing two interior-forming components, thereby RIM forming the interior layer of the part to be molded. The interior-forming gate being located in a different position from the surface-forming gate.

This method can be implemented using an apparatus for molding a multi-property polyurethane part by RIM, which comprises a mold having a surface-forming gate and an interior-forming gate that are open to the cavity of the mold in different positions, a head for mixing two surface-forming components that is connected to the surface-forming gate, a head for mixing two interior-forming components that is connected to the interior-forming gate, and means for reducing the pressure in the cavity.

In this method and apparatus, the number of gates that can be used to form the surface of the molded part is not limited to one, and two or more gates can be used, with each being connected to the head for mixing two surface-forming components. The number of gates that can be used to form the interior layer of the molded part is not limited to one, and two or more gates can be used, with each being connected to the head for mixing two interior-forming components.

The surface-forming RIM polyurethane material can contain at least one auxiliary component, for example, selected from a colorant, a mold release agent and a catalyst.

Two-color parts, the interior layer of which is covered with a thin film of the surface layer, can be molded by RIM from polyurethane. The exact theory of this phenomenon has not yet been clarified but the reason can be postulated as follows. When the cavity of a mold under vacuum is filled with a small amount of the surface forming RIM polyurethane material, the injected polyurethane material as it undergoes a sudden drop in pressure from the existing pressurized state scatters within the cavity and is deposited as a thin film on the surface of the cavity, thereby forming the surface layer of the two-color part to be eventually molded. When the interior forming RIM polyurethane material is thereafter injected into the cavity, the injected polyurethane material fills the cavity and its components react to cure, forming the interior layer of the two-color part. The amount of injection of the surface-forming RIM polyurethane material and the time schedule for injecting the surface- and interior-forming RIM polyurethane materials can be set in any desired way.

In addition, according to the method and the apparatus under consideration, the head for mixing the surface-forming components can be used exclusively for the purpose of forming the surface-forming RIM polyurethane material whereas the head for mixing the interior-forming components can be used exclusively for the purpose of forming the interior-forming RIM polyurethane material; therefore, the respective heads can be fabricated as inexpensive two-component mixing heads.

Furthermore, according to the methods and apparatus described above, other meritorious effect can be attained; namely, a surface layer that is different from the interior layer in color, properties, etc., can be selectively formed in any desired site of the molded part by properly setting the position of the surface-forming gate or the amount of injection of the surface-forming RIM polyurethane material.

In a preferred embodiment, at least one auxiliary component selected from a colorant, a mold release agent and a catalyst can be mixed with the surface forming RIM polyurethane material to ensure that the eventually molded two-color part can be easily rendered to have different colors, properties, etc., in the surface layer and the interior layer. Stated specifically, better release of the molded part is achieved by mixing a mold release agent with the polyurethane material. If a colorant is mixed, the colored surface layer will hide the interior layer of the molded part in a better way such that, for example, a less expensive yellowing isocyanate can be used to form the interior layer. If a catalyst is mixed to control a certain quality such as endurance, hardness or foam density, different properties can easily be provided in the surface layer and the interior layer.

DETAILED DESCRIPTION OF THE INVENTION

Figure 1:
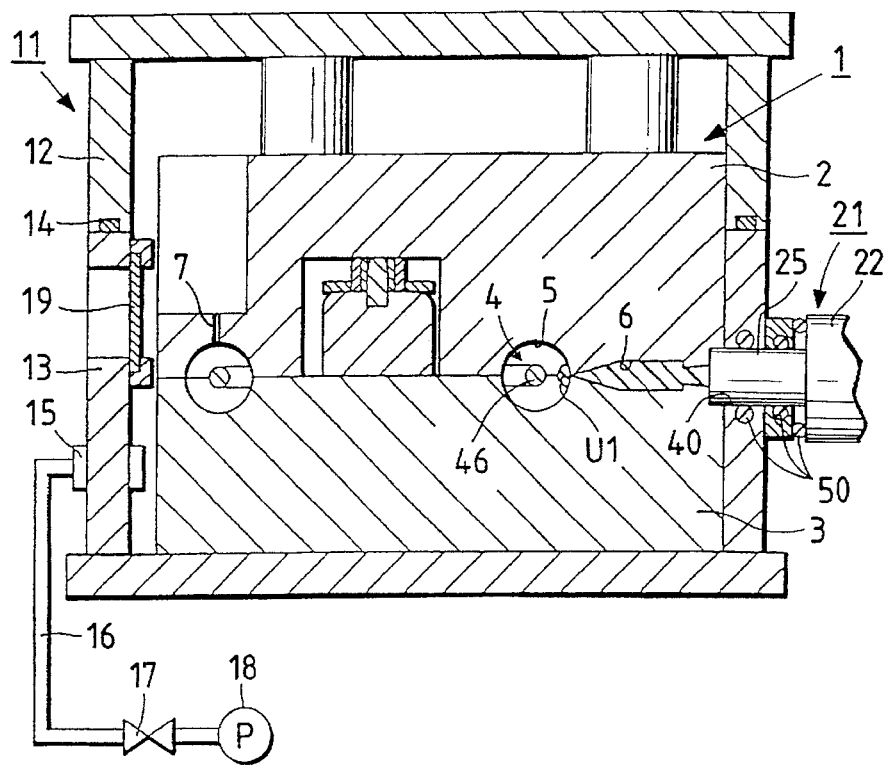
FIG. 1 is a cross-sectional view showing the step of forming the surface layer of a polyurethane coating on a steering wheel in an embodiment according to the present invention.

The present invention will be further described using the following non-limiting illustrative embodiments.

A first embodiment according to the present invention provides a steering wheel produced with reference to FIGS. 1 to 10. The molding apparatus to be used in this embodiment comprises, a mold 1, a vacuum box 11 and a feed injection mechanism 21 as shown in FIGS. 1 to 7. These basic parts of the molding apparatus are described below in further detail.

The mold 1 comprises two split parts, an upper mold 2 and a lower mold 3. The parting line (PL) between the two molds is provided with a cavity surface 5 that forms an annular cavity 4 upon mold closing and a feed passageway 6 to the cavity 4. A venthole 7 is formed in the upper mold 2 at the position where it is to be finally filled with a polyurethane material.

The vacuum box 11 comprises two split parts, an upper box 12 and a lower box 13. The upper box 12 contains the upper mold 2 and the lower box 13 contains the lower mold 3. The upper box 12 and the lower box 13 are fitted on a clamping unit (not shown). In the embodiment under consideration, the lower box 13 will move up and down, so that the vacuum box 11 is opened and closed in synchronism with the opening and closing of the mold 1. An O-ring 14 is fitted in a groove formed in the parting face of the upper box 12. When the vacuum box 11 is closed, the O-ring 14 will contact the parting face of the lower box 13 so as to seal the space between the upper and lower boxes.

The lower box 13 is fitted with a suction plug 15 which is connected via a suction hose 16 and a valve 17 to a vacuum pump 18. The lower box 13 is also furnished with an inspection window 19 that is provided to ensure airtightness and through which the area around the venthole 7 can be seen from the outside of the vacuum box 11.

Figure 5:
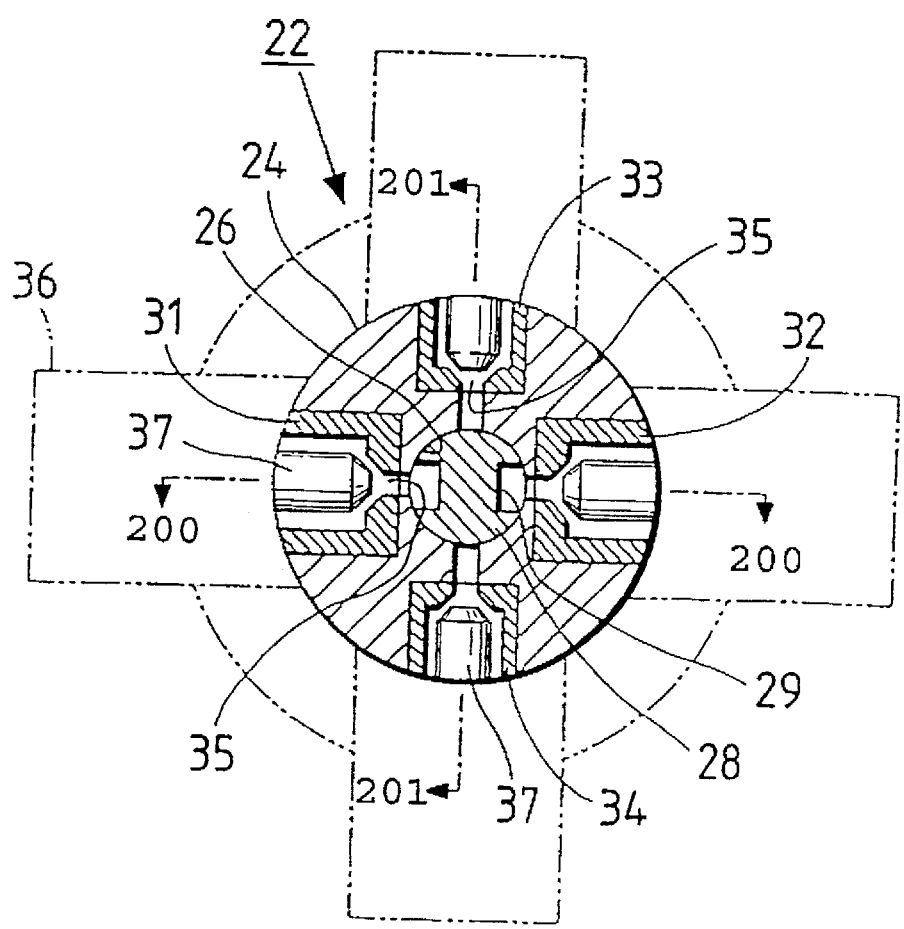
FIG. 5 is a cross-sectional view of the mixing head used in molding the polyurethane coating.
Figure 6:
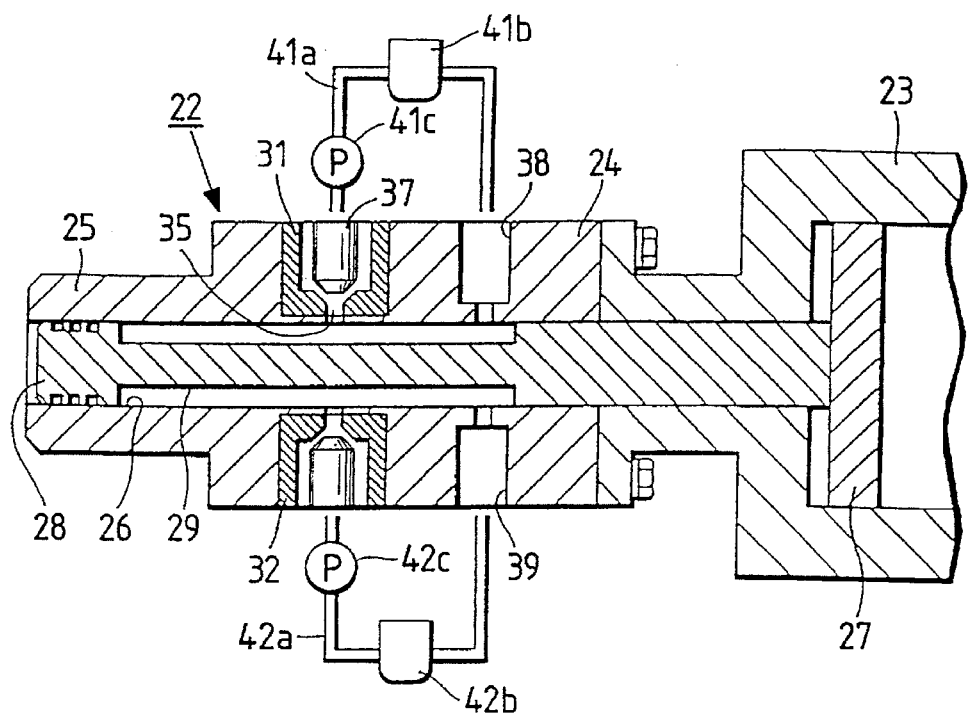
FIG. 6 is a cross section taken on line 200—200 of FIG. 5.
Figure 7:
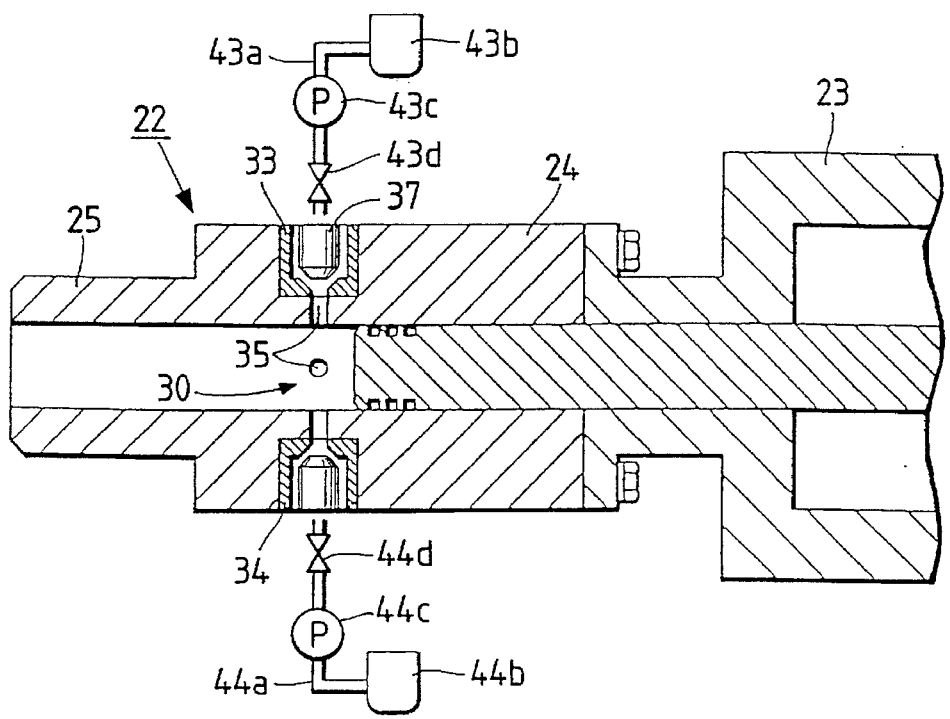
FIG. 7 is a cross section taken on line 201—201 of FIG. 5.

The feed injection mechanism 21 is furnished with a four-component mixing head 22 of the type shown in FIGS. 5 to 7 and it is adapted to ensure that the principal components, for example, the polyol and isocyanate components, are selectively mixed with one of the auxiliary components, for example, the third or fourth component. The four-component mixing head 22 comprises a cylinder 23 and a body 24 fitted to its distal end. The body 24 has a slender injection nozzle 25 at the tip.

A through-hole 26 is formed in the center of the box 24 and a spool 28 fitted on a piston 27 in the cylinder 23 is slidably inserted into the hole 26. A pair of longitudinally extending grooves 29 are formed in diametric positions on the periphery of the spool 28. In response to the reciprocating motion of the piston 27, the spool 28 slides either to the advanced position shown in FIG. 6 or to the retracted position shown in FIG. 7. When in the retracted position, the spool 28 has in front of it a mixing compartment 30 where the necessary components of the feed are to be mixed together in the manner to be described hereinafter.

The body 24 has in its interior a polyol component supply nozzle member 31 on the left side (see FIG. 5) which is disposed to face an isocyanate component supply nozzle member 32 on the right side. The body 24 also has in its interior a third component supply nozzle member 33 in the upper portion (also see FIG. 5) which is disposed to face a fourth component supply nozzle member 34 in the lower portion. Each of the four nozzle members is in a cylindrical shape and has a tapered orifice 35 formed in such a way that it opens to the mixing compartment 30 or elongated grooves 29. A holder 36 of the nozzle members 31 to 34 is fitted around the body 24 and needles 37 are inserted into the holder in such a way that their tips will control the degree of opening of the orifices 35. Next to the nozzle members 31 and 32 in the body 24, there are formed a polyol component returning hole 38 and an isocyanate component returning hole 39, both of which are open to the elongated grooves 29.

The nozzle member 31 and the return hole 38 are connected via hose 41a to a polyol component tank 41 b and pump 41 c, thereby forming circulation path of the polyol component, in particular: tank 41 b, pump 41 c, nozzle member 31, elongated groove 29, return hole 38, and tank 41 c. The nozzle member 32 and the return hole 39 are also connected via hose 42a to an isocyanate component tank 42b and pump 42c, thereby forming a circulation path of the isocyanate component, in particular: tank 42b, pump 42c, nozzle member 32, elongated groove 29, return hole 39, and tank 42b.

The nozzle member 33 is connected via hose 43a to a third component tank 43b, pump 43c and valve 43d, thereby forming a one-way supply path, in particular: tank 43b, pump 3c, valve 43d, and nozzle member 33. The nozzle member 34 is also connected via hose 44a to a fourth component tank 44b, pump 44c and valve 44d, thereby forming a one-way supply path, in particular: tank 44b, pump 44c, valve 44d, and nozzle member 34.

The injection nozzle 25 on the four-component mixing head 22 penetrates a through-hole 40 in the lower box 13 to be connected to the feed passageway 6 in the lower mold 3. The space between the four-component mixing head 22 and the inner surface of the through-hole 40 is sealed, for example, by means of a plurality of O-rings 50, as shown in FIG. 1.

The method of molding a multi-property polyurethane component, such as a two-color component where the surface and interior layers have different colors, by RIM, using the apparatus described above is discussed below in terms of the sequence of steps involved.

(1) Open the mold 1 and apply a mold release agent to the cavity surface 5 defined by the upper mold 2 and lower mold 3.

(2) Set the core 46 of a steering wheel 45 in the lower mold 3; then close the mold 1 to form the cavity 4 while, at the same time, the vacuum box 11 is closed airtight.

(3) Operate the vacuum pump 18 to produce a suitable degree of vacuum within the vacuum box 11 and evacuate the interior of the cavity 4 via the venthole 7. The suitable vacuum can be, for example, that vacuum which will provide complete coverage of the interior layer by the coating layer, or that vacuum which will provide the desired degree of coverage of the interior layer by the coating layer.

(4) With the cavity 4 being evacuated continuously as shown in FIG. 1, a surface forming RIM polyurethane material U1 is prepared in the manner described below and a small amount of it is injected into the cavity 4 through the nozzle 25. First, the spool 28 is retracted and the polyol component, the isocyanate component and the fourth component, for example, a first colorant, are delivered into the mixing compartment through the nozzle member 31, the nozzle member 32 and the nozzle member 34, respectively. These components are then mixed by impingement to prepare the surface forming RIM polyurethane material U1. In this case, the third component is not delivered into the mixing compartment 30.

However, in the case where a mold release agent is incorporated in the surface layer forming operation, the mold release agent applying step (1) can be omitted.

Figure 2:
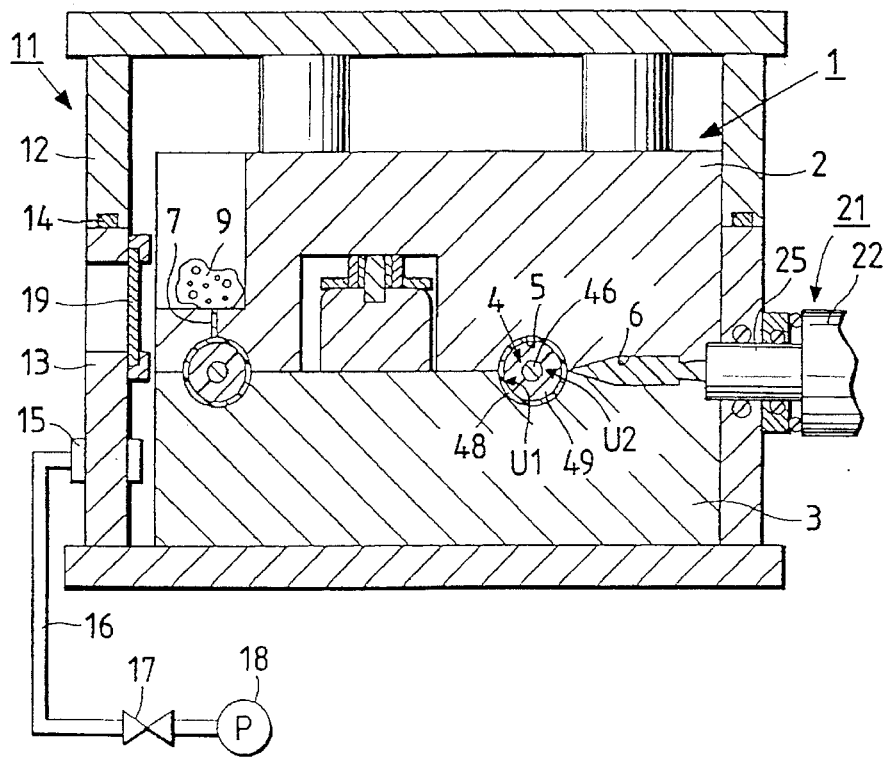
FIG. 2 is a cross-sectional view showing the step of forming the interior layer of the polyurethane coating in the embodiment of FIG. 1.

(5) With the cavity 4 being evacuated continuously as shown in FIG. 2, an interior forming RIM polyurethane material U2 is prepared in the manner described below and injected into the cavity 4 through the nozzle 25. In this case, the delivery of the fourth component in the previous step is ceased when a predetermined amount has been delivered. Then, with the polyol and isocyanate components being delivered continuously, a second colorant, as the third component, is pumped into the mixing compartment 30 through the nozzle member 33. The respective components are then mixed by impingement to prepare the interior forming RIM polyurethane material U2. In the embodiment under consideration, this interior forming RIM polyurethane material U2 is substantially free of a blowing agent.

The injected interior forming RIM polyurethane material U2 will fill the cavity 4 in the following matter. First, in the part of the material U2 which is distant from the cavity face 5, the gas inherent in the material U2 will boil up under vacuum, thus forming an interior layer of high blow ratio. In the part of the material U2 which is to be close to the cavity face 5, a dense self-skin producing layer of low blow ratio is formed by the degasifying action in a vacuum atmosphere. Formed in this manner is an interior layer 49 that comprises the core and the self-skin producing layer. It should be noted that the flowing tip of the material U2 will blow out of the venthole 7 in a small amount, thus producing a blowout portion (6) After confirming that the surface forming RIM polyurethane material U1 and the interior forming RIM polyurethane material U2 have cured, the mold 1 is opened and, at the same time, the vacuum box 11 is opened. Finally, the steering wheel 45 with a polyurethane coating 47 is taken out of the mold and the blowout portion 9 is removed.

Figure 3:
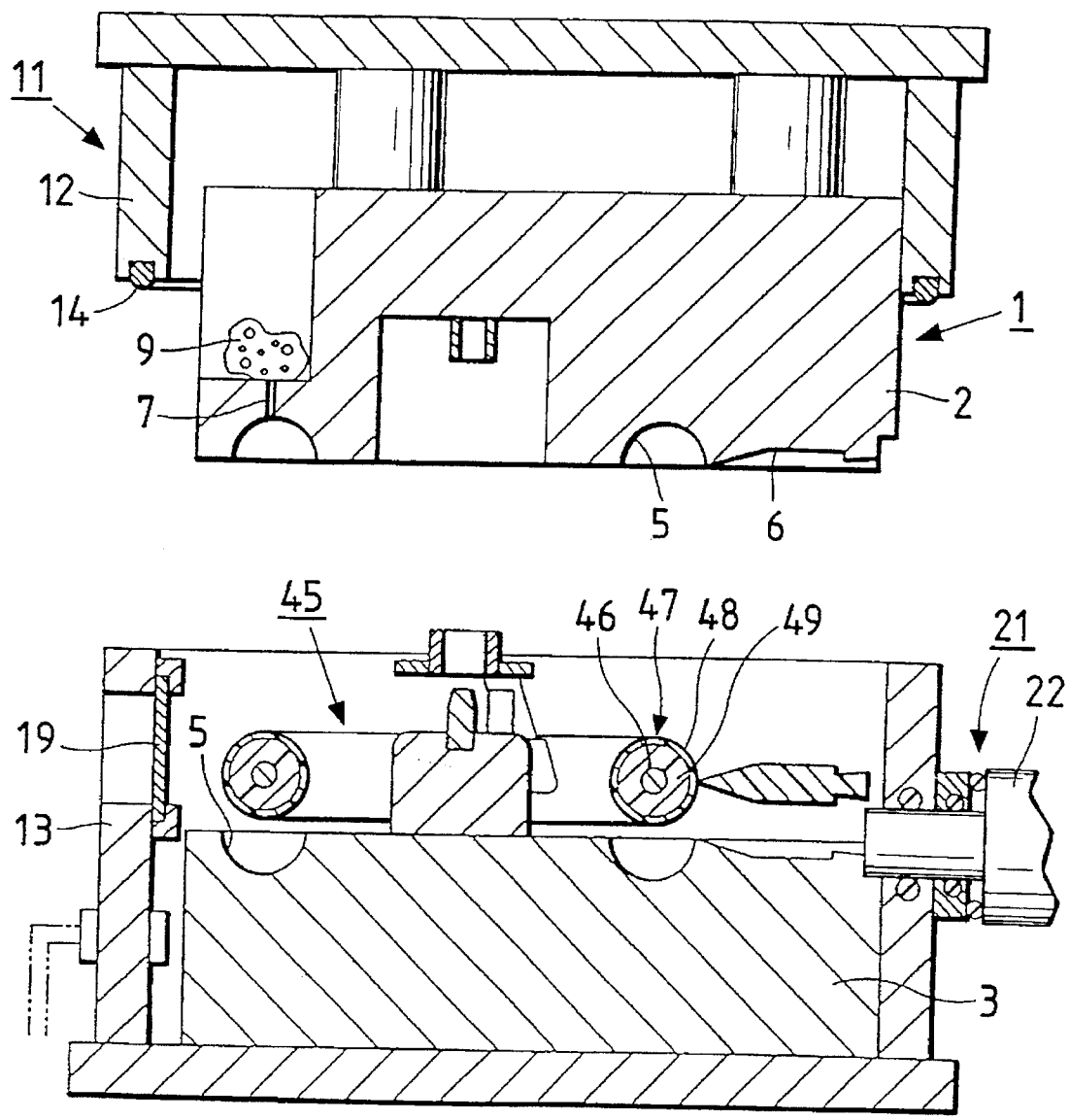
FIG. 3 is a cross-sectional view showing the step of removing the molded part.
Figure 4:
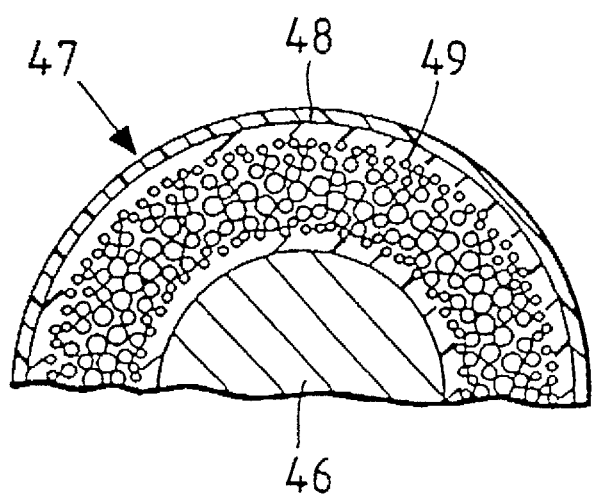
FIG. 4 is a cross-sectional view of the polyurethane coating molded in two colors.

The two-color polyurethane coating 47 thus produced by RIM is characterized in that the surface layer 48 is adequately tinted with the first colorant which is admixed as the fourth component with the surface forming RIM polyurethane material U1. Furthermore, as shown in FIGS. 3 and 4, the surface layer 48 forms a thin film that covers the entire surface of the interior layer 49 on account of its excellent masking ability and, hence, the steering wheel 45 provided with the polyurethane coating 47 can be sold as such on the market. Therefore, according to this embodiment, the conventional process of applying a colorant to the cavity surface 5 prior to molding can be omitted.

The present inventors conducted tests in order to investigate how the evacuation of the cavity 4 and the amount of colorant to be admixed with the surface forming polyurethane material U1 should be adjusted to ensure that the surface layer 48 of the polyurethane coating 47 molded by means of the molding machine shown in FIGS. 1 to 7 will cover the entire surface of the interior layer 49. The core 46 of the steering wheel employed had a circumference of 120 cm.

In the first test, the degree of vacuum in the cavity 4 was set at five levels 10, 14, 34, 46 and 67 Torr, and the necessary molding components were injected by the following procedure for the respective cases.

(i) The surface forming RIM polyurethane material U1 that was composed by mixing the first colorant (the fourth component), polyol component and isocyanate component in a weight ratio of 1:10:5. The amount injected was 50 g;

(ii) Subsequently, the interior forming RIM polyurethane material U2 that was composed by mixing the second colorant (the third component), polyol component and isocyanate component in a weight ratio of 1:10:5. The amount injected was 400 g;

(iii) Thereafter, the two feeds were blown and cured to produce molded parts.

The polyol component was a polyether-base polyol produced by Sanyo Chemical Industries Ltd. under the trade name "FA-760" (average molecular wt. was about 5,000), and the isocyanate component was a methyl diisocyanate (MDI) prepolymer produced by Nippon Polyurethane Industry Co., Ltd. under the trade name "COLLONATE 1051". The respective colorants were prepared by mixing the associated pigments (6 parts by weight) with the above-mentioned polyol component (9 parts by weight).

In the present invention, the polyol component can be, for example: a polyether-base polyol, a polyester-base polyol, polyacryl-base polyol, polyepoxy-base polyol or polybutadiene-base polyol. The isocyanate component can be, for example: MDI (methyl diisocyanate), TDI (tolylene diisocyanate), NDI (naphtalene diisocyanate, TODI (tolidine diiscocynate) or XDI (xylene diiscocyanate).

Figure 8:
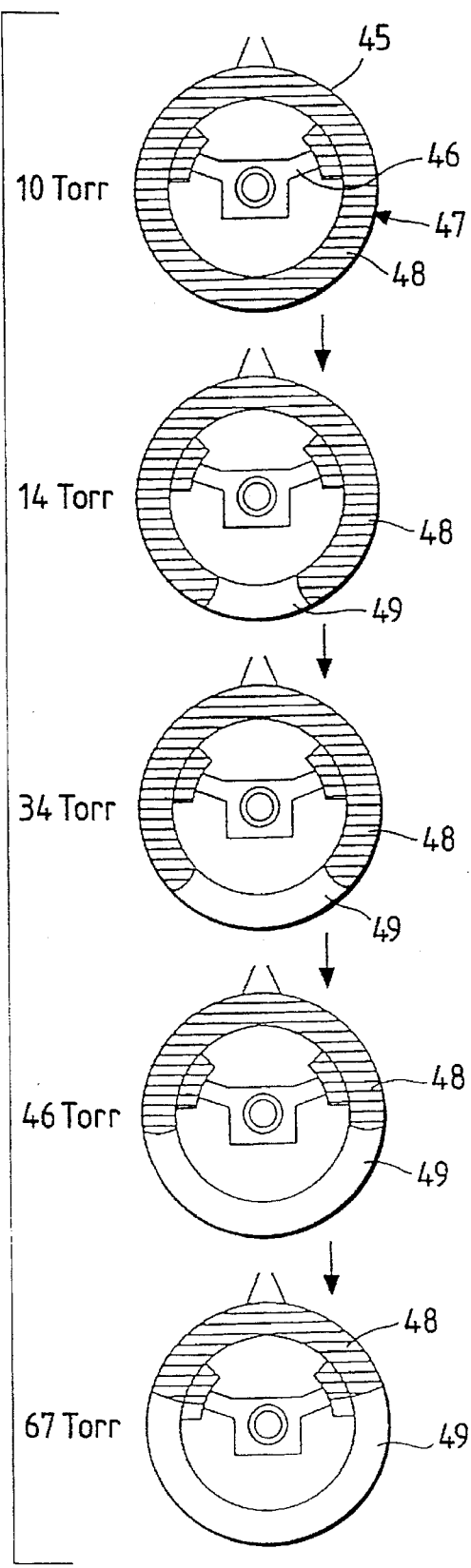
FIG. 8 illustrates the results of the test conducted in order to investigate the relationship between the length of the surface layer of the polyurethane coating and the degree of vacuum in the mold cavity for the case where the surface forming RIM polyurethane material was injected in an amount of 50 g.
Figure 10:
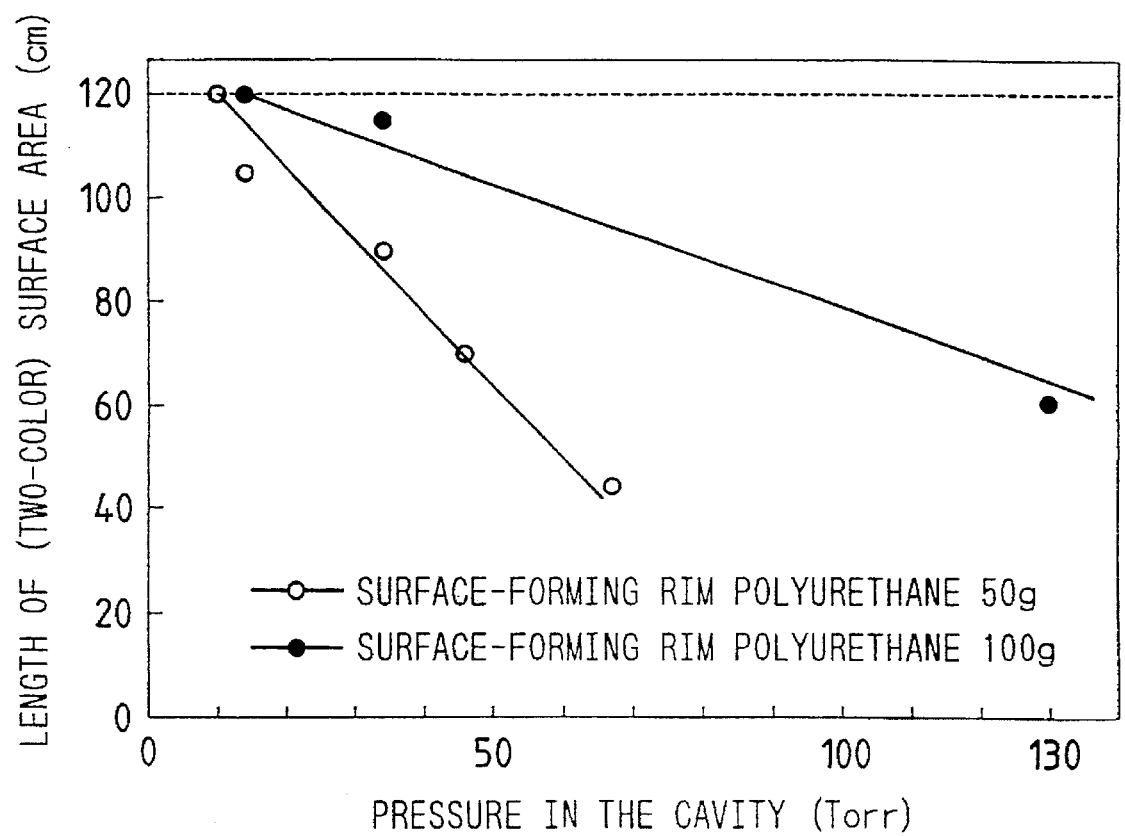
FIG. 10 is a graph plotting the test results shown in FIG. 8 together with those shown in FIG. 9.

The results of the first test are shown in FIGS. 8 and 10. The surface layer 48 covered the entire circumference of the interior layer 49 when the degree of vacuum in the cavity 4 was 10 Torr. However, when the degree of vacuum was greater than 14 Torr, the surface layer 48 covered only part of the interior layer 49. Furthermore, the higher the pressure in the cavity 4, the shorter the surface layer 48, namely, the two-color part. This is probably due to the surface forming RIM polyurethane material U1 being scattered within the cavity 4 at higher pressures.

In the second test, the degree of vacuum in the cavity 4 was set at three levels, 14, 34 and 130 Torr, and the necessary molding components were injected by the following procedure.

(i) The surface forming RIM polyurethane material U1 of the same composition as in the first test was injected in an amount of 100 g;

(ii) Immediately after, the interior forming RIM polyurethane material U2 of the same composition as in the first test was injected in an amount of 350 g;

(iii) Thereafter, the two feeds were blown and cured to produce molded parts.

Figure 9:
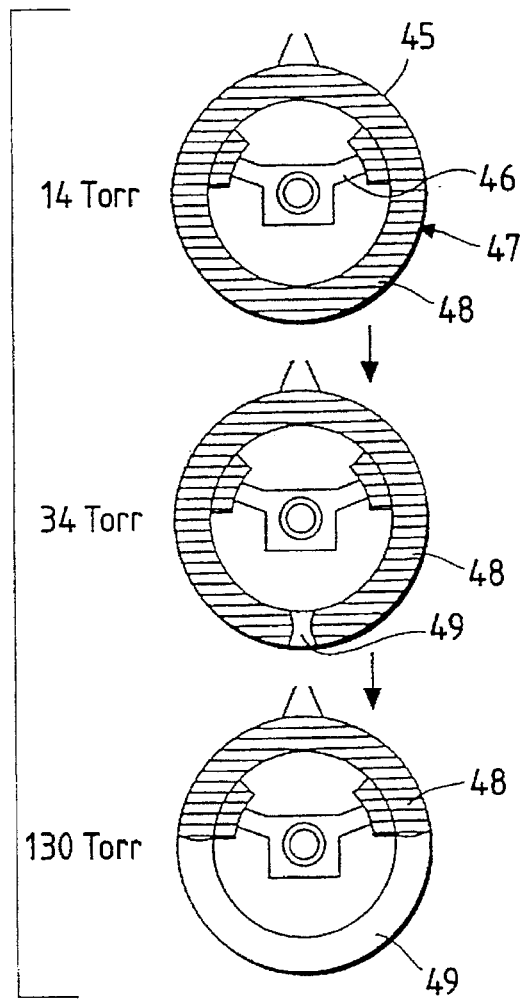
FIG. 9 illustrates the results of the test conducted in order to investigate the relationship between the length of the surface layer of the polyurethane coating and the degree of vacuum in the mold cavity for the case where the surface forming RIM polyurethane material was injected in an amount of 100 g.

The results of the second test are shown in FIGS. 9 and 10. The surface layer 48 could cover the entire circumference of the interior layer 49 when the degree of vacuum in the cavity 4 was 14 Torr. At higher pressures, the surface layer 48 covering became smaller at a lower rate than in the first test.

The tests under consideration concern a steering wheel of large circumference, so in the case of molding smaller parts, it is believed that complete products can be provided even if the degree of vacuum in the cavity is low or if the surface forming RIM polyurethane material is injected in a small amount.

However, the surface forming RIM polyurethane material and/or the interior forming RIM polyurethane material can be varied in accordance with a surface layer, volume, configuration (length, thickness) and so on of the components to be produced, or in accordance with a thickness of the surface layer to be required.

Figure 11:
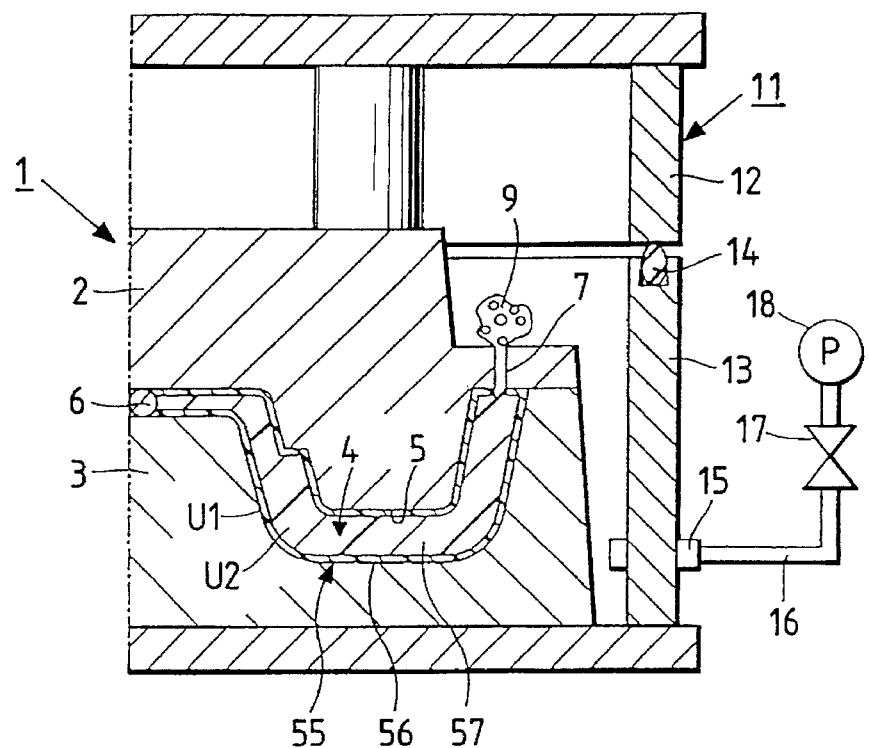
FIG. 11 is a cross-sectional view showing the two-color molding of a steering wheel pad in an embodiment of the present invention.
Figure 12:
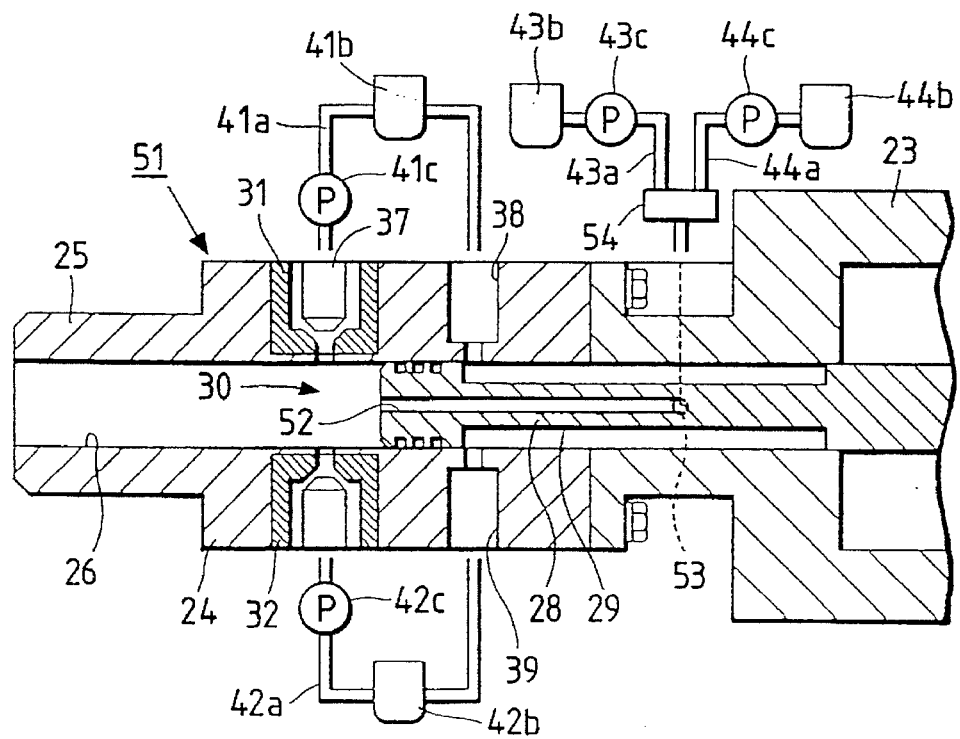
FIG. 12 is a cross-sectional view of the mixing head used in the molding of the pad.

In a second embodiment of the present invention, a molded two-color pad for a steering wheel by RIM as described with reference to FIGS. 11 and 12 is provided. The molding machine to be used in this second embodiment differs from that which is used in the first embodiment only in terms of the shape of machine parts, in particular the cavity 4, and the construction of the mixing head described below. The machine parts that are shown in FIGS. 11 and 12 and which are the same as those used in the first embodiment are identified by like numerals and will not be described in detail.

In the second embodiment, a three-component mixing head that is generally indicated by 51 in FIG. 12 is used. This three-component mixing head 51 does not have nozzle members 33 and 34 and, instead, an auxiliary hole 52 for delivery of the third component is provided in the center of the spool 28. The front end of the auxiliary hole 52 opens to the tip face of the spool 28 whereas the rear end of the same hole opens at a point halfway on the circumference of the spool 28. The rear part of the body 24 has a feed hole 53 formed that will communicate with the opening at the rear end of the auxiliary hole 52 only at the time the spool 28 is retracted. The feed hole 53 is connected via a switch valve 54 to the tank 43b and pump 43c for the third component, as well as to the tank 44b and pump 44c for the fourth component. Tank 43b and pump 43c are connected by the hose 43a, whereas tank 44b and pump 44c are connected by the hose 44a. The combination of tank 43b and pump 43c is selectively operable with respect to the combination of tank 44b and 44c.

The method of molding a two-color polyurethane part by RIM in the second embodiment can be used to mold a pad 55 comprising the surface layer 56 and the interior layer 57. It differs from the molding method of the first embodiment only in the following point. Prior to molding, the switch valve 54 is brought to the side connected to the tank 44b of the fourth component, so that a mixture of a mold release agent and the first colorant (both as the fourth component) is charged to that part of the auxiliary hole 52 where it is adjacent to the exit portion of the mixing compartment 30. Thereafter, the switch valve 54 is brought to the side connected to the tank 43b of the second colorant as the third component.

When RIM is conducted with the molding machine preset in the manner described above, the polyol component, the isocyanate component and the fourth component preliminarily charged into the auxiliary hole 52 are delivered to the mixing compartment 30, where they are mixed by impingement to form the surface forming RIM polyurethane material U1, which is thereafter injected into the cavity 4. As in the first embodiment, the injected surface forming RIM polyurethane material U1 provides a thin-film deposit on the cavity surface 5, thereby forming the surface layer 56.

If the fourth component is no longer present in the auxiliary hole 52, the third component will be delivered spontaneously and, hence, the three components, for example, the third component and the polyol as well as isocyanate components, are similarly mixed by impingement to form the interior forming RIM polyurethane material U2, which is then injected into the cavity 4. As in the first embodiment, the injected surface forming RIM polyurethane U1 will foam and become fluid to form the interior layer 57.

Hence, according to the second embodiment in which the surface layer 56 of the molded pad 55 contains the mold release agent and the first colorant, the conventional step of applying both the release agent and the colorant to the cavity surface 5 before molding starts, can be omitted.

It is further noted that the present invention is in no way limited to the two embodiments described above. The present invention has been described with respect to a molded product of two-colors. However one skilled in the art will appreciate that the invention is not limited to variable colors but can be useful in providing parts of variable physical properties other than color. Accordingly, various modifications can be made, without departing from the spirit of the present invention. The method according to the present invention enables, at a minimum, a two-color part, readily molded from polyurethane by RIM, with the interior layer of the part being covered by a thin film on its surface layer.

According to the method of the present invention, application of a mold release agent or a colorant to the cavity surface before molding starts can be omitted and a greater latitude is provided for altering various characteristics including color, hardness and endurance.

A third embodiment of the present invention relates to a method of molding of a different property RIM polyurethane coating on a steering wheel is described below with reference to FIGS. 13 to 18. The molding apparatus to be used in this embodiment comprises a mold 101, a vacuum box 111 and two-component mixing heads 121 and 122. These parts of the molding apparatus are described below in detail.

The mold 101 comprises two split parts, an upper mold 102 and a lower mold 103. The parting line (PL) between the two molds is provided with a cavity surface 105 that forms an annular cavity 104 upon mold closing, as well as a sprue 106, a runner 107 and a common gate 108 that is open to the cavity 104. The members 106, 107 and 108 provide a feed passageway. The lower mold 103 has a runner 120 that extends upward from the bottom face to be open to the common gate 108. A vent hole 110 is formed in the upper mold 102 at the position where it is to be finally filled with a polyurethane material.

The vacuum box 111 provides an airtight enclosure of the mold 101 containing an empty space K and comprises two split parts, an upper box 112 and a lower box 113. The upper box 112 contains the upper mold 102 and the lower box 113 contains the lower mold 103. The upper box 112 and the lower box 113 are fitted on a clamping unit (not shown) In the present embodiment, the lower box 113 can move up and down, so that the vacuum box 111 is opened and closed in synchronism with the opening and closing of the mold 101. An O-ring 114, for example, is fitted in a groove formed in the parting face of the upper box 112, wherby, when the vacuum box 111 is closed, the O-ring 114 will contact the parting face of the lower box 113 so as to seal the space between the upper and lower boxes.

The lower box 113 is fitted with a suction plug 115 which is connected via a suction hose 116 and a valve 117 to a vacuum pump 118. The lower box 113 is also furnished with an inspection window 119 that is provided to insure airtightness and through which the area around the venthole 107 can be seen from the outside of the vacuum box 111.

Figure 17:
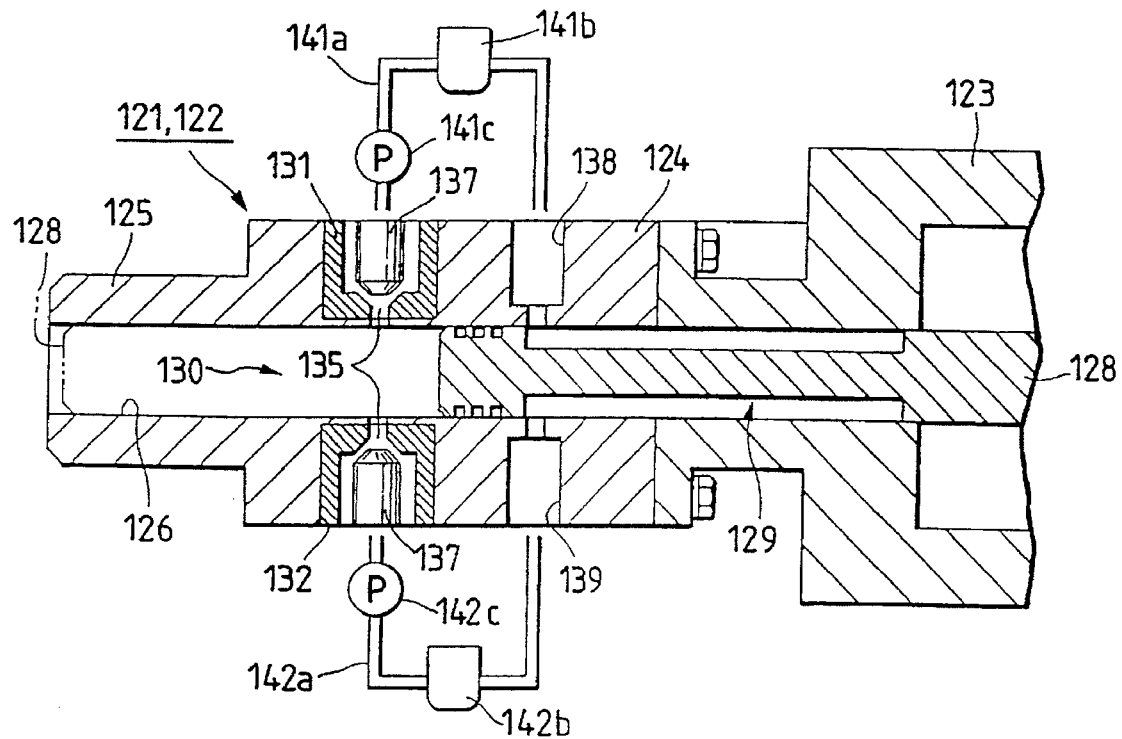
FIG. 17 is a cross-sectional view of the two-component mixing heads for use in molding in an embodiment.

The head 121 for mixing two surface-forming components and the head 122 for mixing two interior-forming components have the same construction and each comprises a cylinder 123 and a body 124 fitted on the distal end as shown in FIG. 17. The body 124 has a slender injection nozzle 125 at the tip. A through-hole 126 is formed in the center of the body 124 and a spool 128 fitted on a piston (not shown) in the cylinder 123 is slidably inserted into the hole 126. A pair of longitudinally extending grooves 129 are formed in diametric positions on the periphery of the spool 128. In response to the reciprocating motion of the piston, the spool 128 slides either to the advanced position shown by a one long and two short dashed line in FIG. 17 or to the retracted position shown by a solid line in FIG. 17. When in the retracted position, the spool 128 has in front of it a mixing compartment 130 where the necessary components of the feed are to be mixed together in the manner to be described hereinafter.

The body 124 has in its interior a polyol component supply nozzle member 131 which is disposed to face an isocyanate component supply nozzle member 132. Each nozzle member has a tapered orifice 135 formed in such a way that it opens to the mixing compartment 130 or elongated grooves 129. A holder (not shown) of the nozzle members 131 and 132 is fitted around the body 124 and needles 137 are inserted into the holder in such a way that their tips will control the degree of opening of the orifices 135. Next to the nozzle members 131 and 132 in the body 124, there are formed a polyol component returning hole 138 and an isocyanate component returning hole 139, both of which are open to the elongated grooves 129.

The nozzle member 131 and the return hole 138 are connected via hose 141a to a polyol component tank 141 b and pump 141 c, thereby forming a circulation path of the polyol component, in particular: tank 141 b→pump 141c→nozzle member 131→ elongated groove 129→return hole 138→tank 141 c. The nozzle member 132 and the return hole 139 are also connected via hose 142a to an isocyanate component tank 142b and pump 142c, thereby forming a circulation path of the isocyanate component, in particular: tank 142b→pump 142c→nozzle member 132→elongated groove 129→return hole 139→tank 142b.

The injection nozzle 125 on the head 121 for mixing two surface-forming components penetrates a through-hole 140 in the bottom plate of the lower box 113 to be connected to the runner 120. The injection nozzle 125 on the head 122 for mixing two interior-forming components penetrates a through-hole 140 in a side plate of the lower box 113 to be connected to the runner 107. The gaps between the mixing head 121 and the inner surface of the through-hole 140 are sealed by means of a plurality of O-rings 150 and so are the gaps between the mixing head 122 and the inner surface of the through-hole 140. Thus, in this embodiment, two inexpensive heads 121 and 122 are employed for mixing four components which has the advantage of reducing the equipment cost compared to the use of one head for mixing four components.

A method of molding a multi-property polyurethane coating by RIM according to the embodiment under consideration using the apparatus described above is discussed below in terms of the sequence of steps involved.

(1) Open the mold 101 and apply a mold release agent to the cavity surfaces 105 defined by the upper mold 102 and lower mold 103.

(2) Set the core 146 of a steering wheel 145 along the cavity surface 105 in the lower mold 103; then close the mold 101 to form the cavity 104 while, at the same time, the vacuum box 111 is closed airtight.

(3) Operate the vacuum pump 118 to produce a suitable degree of vacuum within the space K in the vacuum box 111 and evacuate the interior of the cavity 104 to generally the same degree of vacuum via the vent hole 107 and through the very small clearance between the surfaces on both sides of the parting line (PL). A suitable vacuum can be that vacuum which will provide complete coverage of the interior layer by the coating layer, or that vacuum which will provide the desired degree of coverage of the interior layer by the coating layer. It should be noted here that the space K serves as an accumulator which prevents the air pressure in the cavity 104 from building up when the molding materials to be described below are injected into the cavity 104 and allowed to foam.

Figure 13:
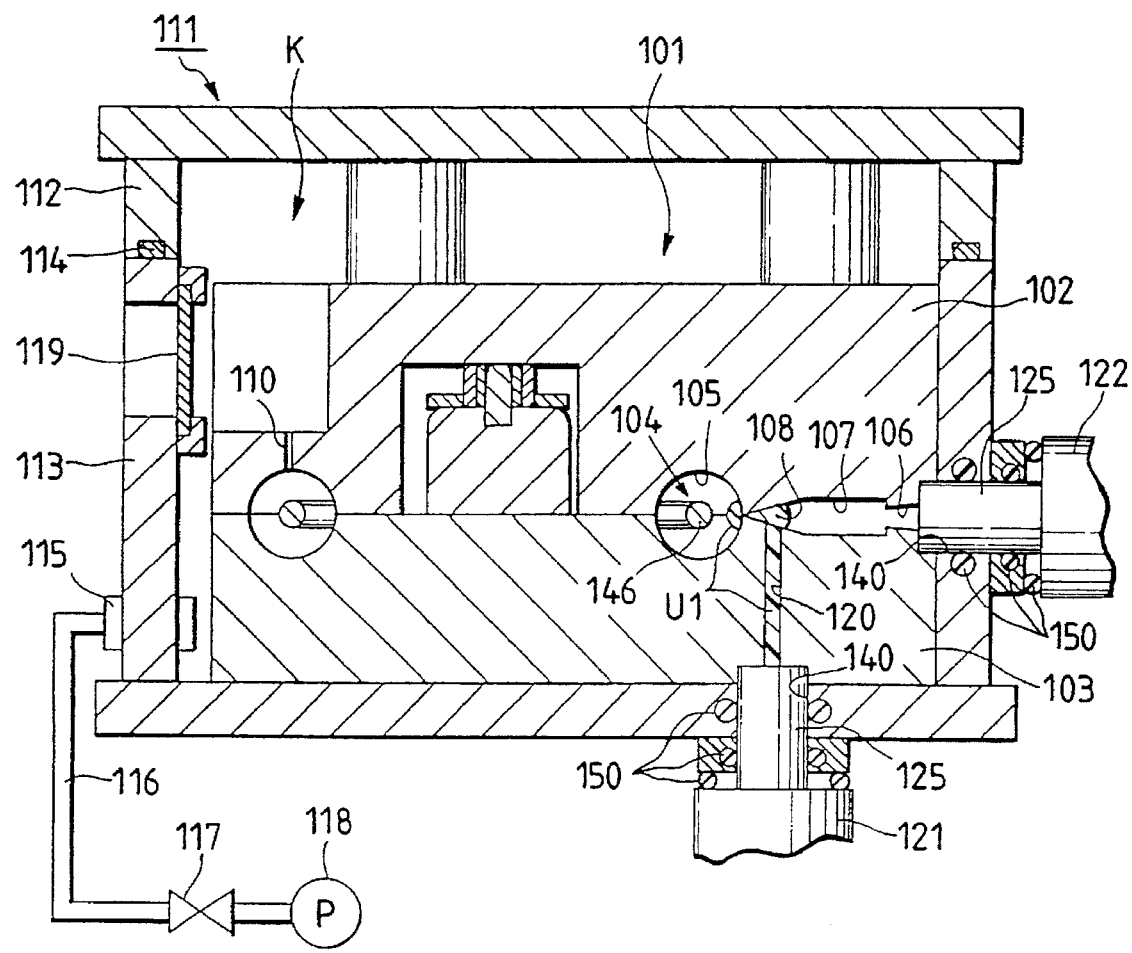
FIG. 13 is a cross-sectional view showing the step of forming the surface layer of a polyurethane coating on a steering wheel in the method of molding a two-color part in an embodiment of the invention.
Figure 14:
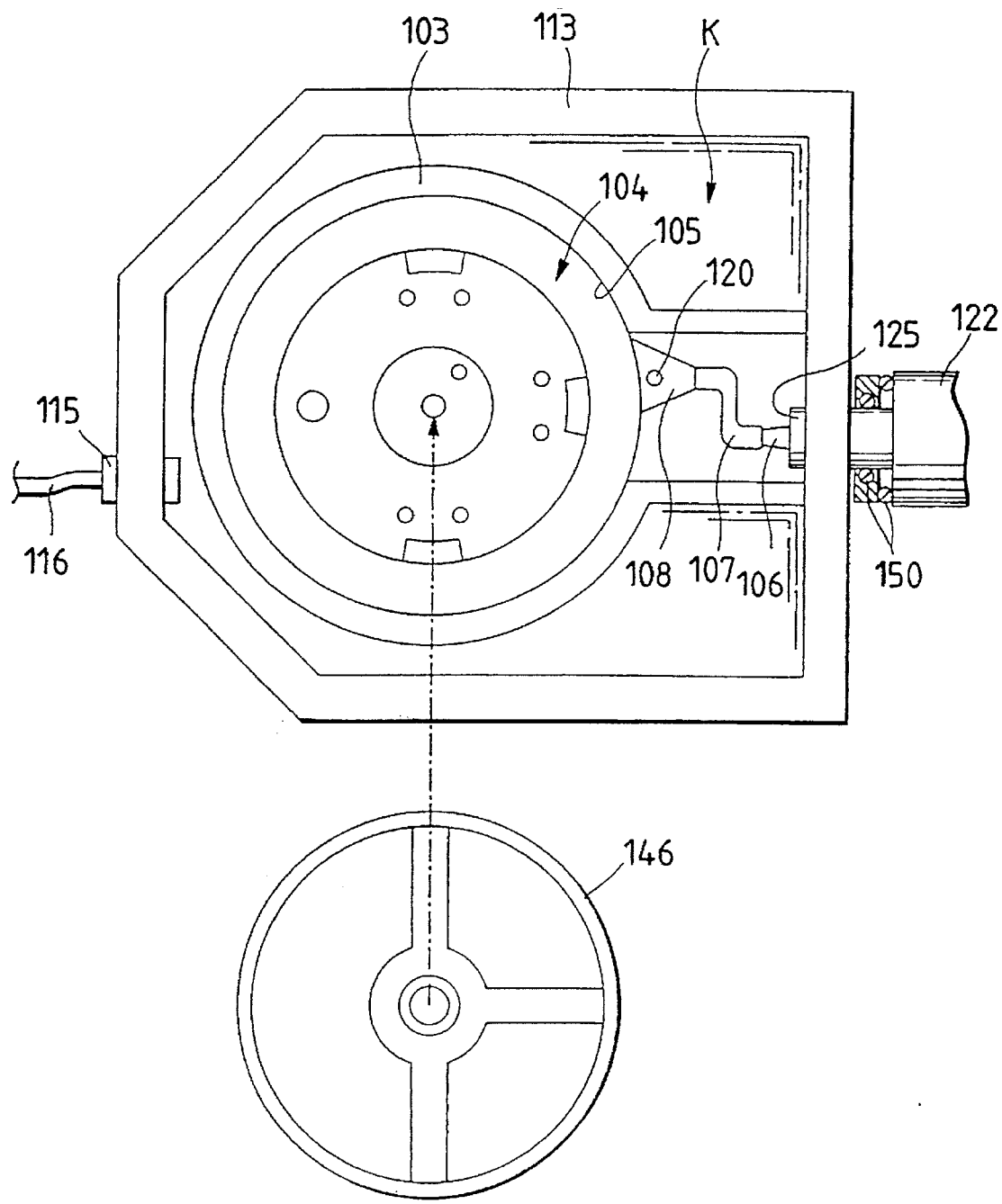
FIG. 14 is a plan view showing the step of setting the core of the steering wheel in the lower mold.

(4) The spool 128 in the head 121 for mixing two surface-forming components is retracted and the polyol component extruded from the nozzle member 131 and the isocyanate component extruded from the nozzle member 132 are delivered into the mixing compartment 130, where they are mixed by impingement to prepare the surface-forming RIM polyurethane material U1. The polyol component comprises a comparatively expansive non-yellowing material loaded with a coloring component. As shown in FIG. 13, the material U1 is injected in a small amount into the evacuated cavity 104 from the injection nozzle 125 on the mixing head 121 through the runner 120 and the common gate 108.

The injected small amount of surface-forming RIM polyurethane material U1 undergoes a sudden drop in pressure from the existing pressurized state and scatters within the cavity 104 and is deposited as a thin film on the cavity surfaces 105, thereby molding the surface layer 148 of a coating 147. Since the space K works as an accumulator, the pressure reduction by means of the vacuum pump 118 can be ceased or continued. After a predetermined amount of the polyurethane material U1 has been injected, the spool 128 is advanced and the injection of the material U1 is stopped.

Figure 15:
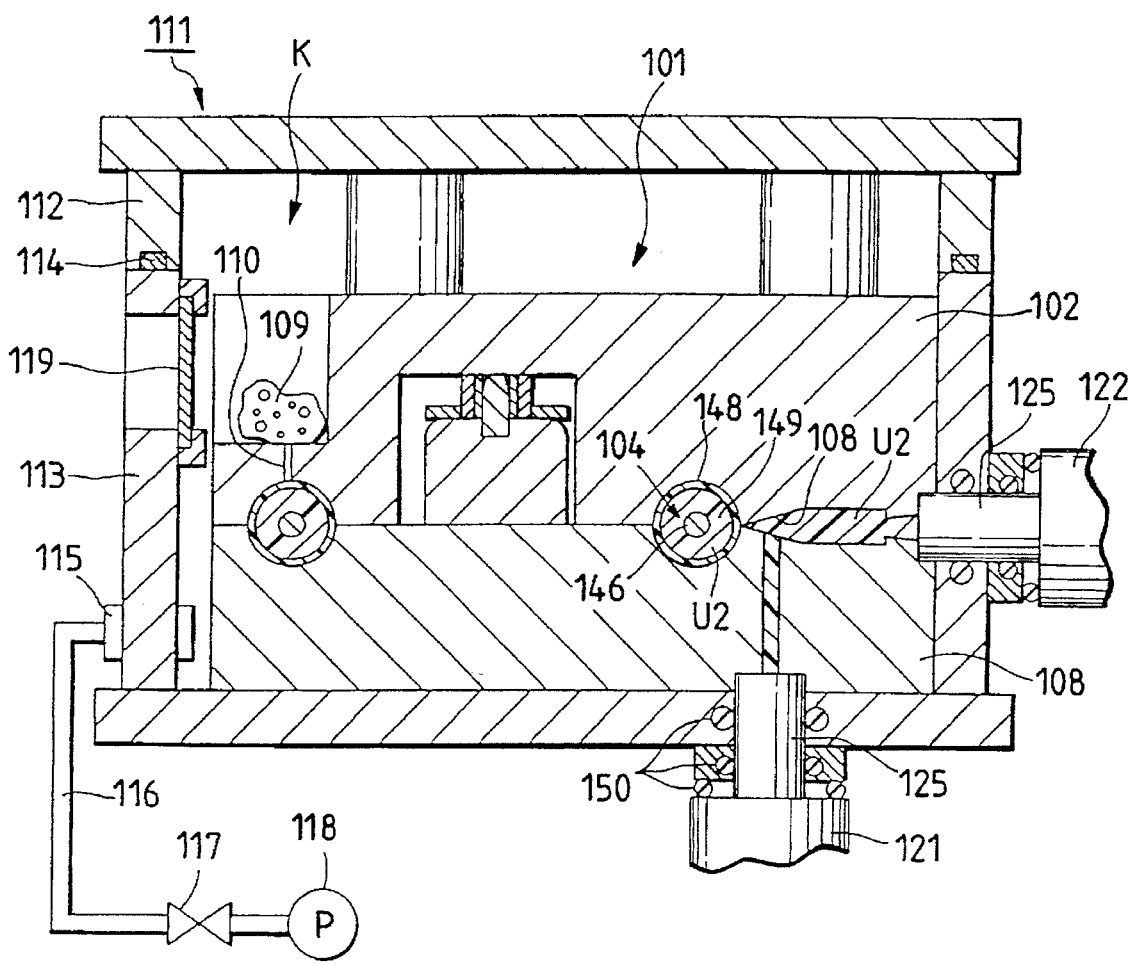
FIG. 15 is a cross-sectional view showing the step of the forming the interior layer of the polyurethane coating.

(5) The spool 128 in the head 122 for mixing two interior-forming components is retracted and the polyol component extruded from the nozzle member 131 and the isocyanate component extruded from the nozzle member 132 are delivered into the mixing compartment 130, where they are mixed by impingement to prepare the interior-forming RIM polyurethane material U2. The polyol component comprises a comparatively inexpensive yellowing material and is not loaded with a coloring component. As shown in FIG. 15, the material U2 is injected into the evacuated cavity 104 from the injection nozzle 125 on the mixing head 122 through the runner 107 and the common gate 108. In this embodiment, the interior-forming RIM polyurethane material U2 is substantially free of a blowing agent.

The injected interior forming RIM polyurethane material U2 will fill the cavity 104 in the following manner. First, in the part of the material U2 which is distant from the cavity face 105, the gas inherent in U2 will boil up in a vacuum atmosphere, thus forming an interior layer of high blow ratio. In the part of the material U2 which is close to the cavity face 105, a dense self-skin producing layer of low blow ratio is formed by the degasifying action in a vacuum atmosphere. Formed in this manner is the interior layer 149 of the coating 147 that comprises the core and the self-skin producing layer. Here again, the space works K as an accumulator, so the pressure reduction by means of the vacuum pump 118 can be ceased or continued. The flowing tip of the material U2 can slightly blow out of the vent hole 107 in a small amount, thus producing a blowout portion 109.

Figure 16:
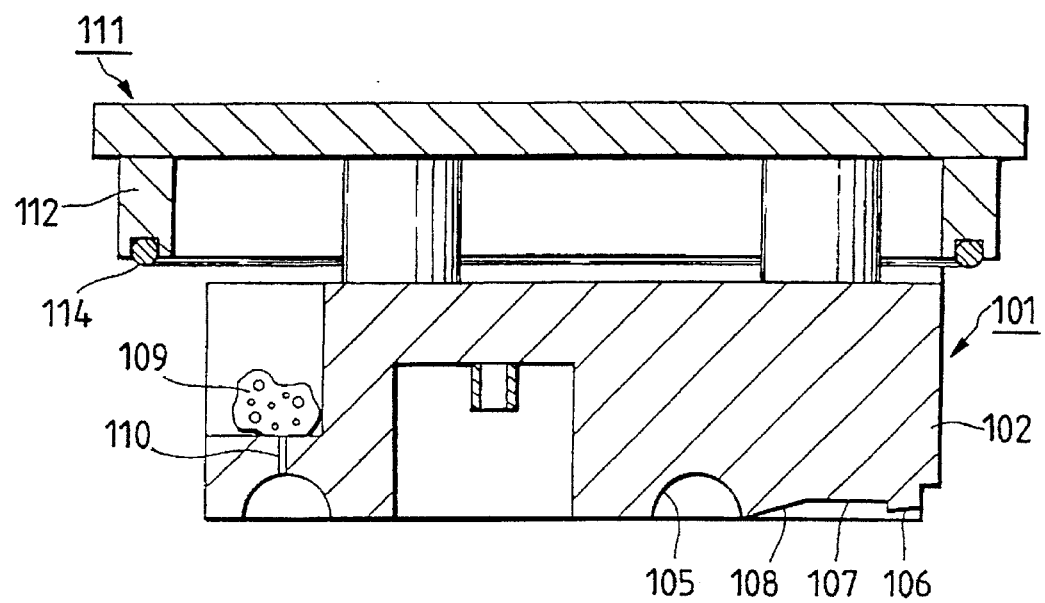
FIG. 16 is a cross-sectional view showing the step of removing the molded article from the mold.
Figure 16:
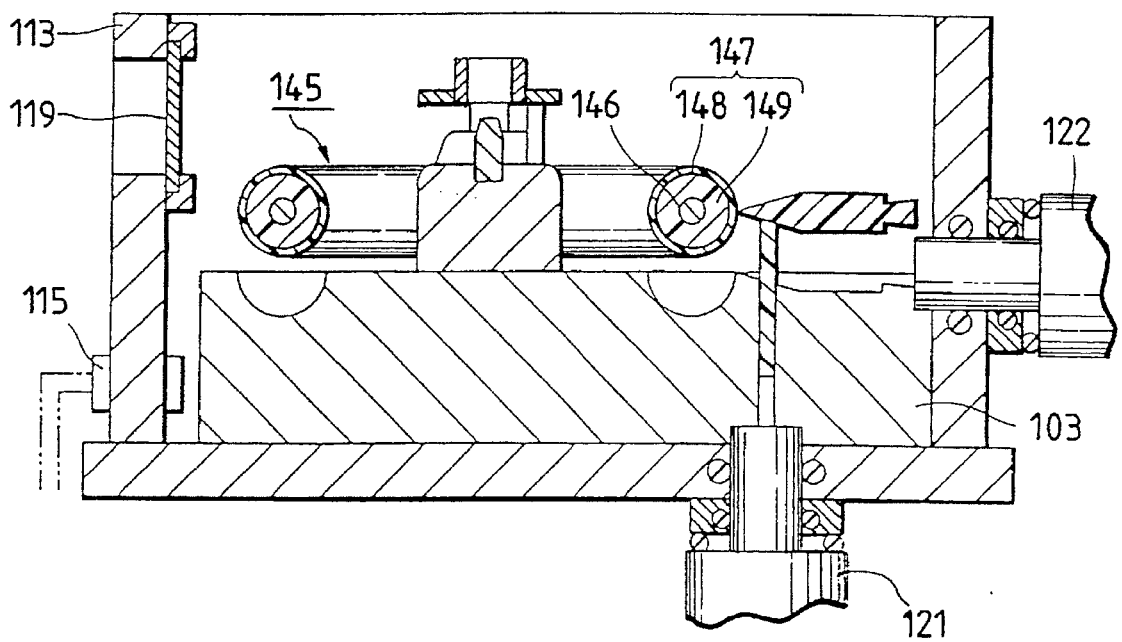

(6) After confirming that the surface forming RIM polyurethane material U1 and the interior forming RIM polyurethane material U2 have cured, the mold 101 is opened and, at the same time, the vacuum box 111 is opened as shown in FIG. 16. Finally, the steering wheel 145 with the polyurethane coating 147 is taken out of the mold and the blowout portion 109 is removed.

Figure 18:
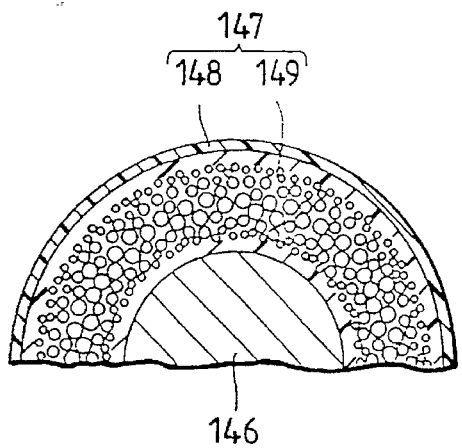
FIG. 18 is a cross-sectional view of the molded polyurethane article.

The multi-property polyurethane coating 147 thus produced by RIM is characterized in that the surface layer 148 is adequately tinted with the coloring component in the surface forming RIM polyurethane material U1. Furthermore, as shown in FIG. 18, the surface layer 148 forms a thin film that covers the entire surface of the colorant-free interior layer 149 on account of its good hiding power and, hence, the steering wheel provided with the polyurethane coating 147 can be sold as such on the market. Therefore, according to this embodiment, the step of applying a colorant to the cavity surface 105 prior to molding can be omitted. As a further advantage, the coating 147 which has been molded using the comparatively expensive non-yellowing material in no other areas than the surface layer 148 can be produced at a lower cost than when the entire part of the coating is molded from the expensive non-yellowing material.

A fourth embodiment of the present invention is described below with reference to FIGS. 19 to 23. In the fourth embodiment, the surface layer 148 is molded only at a specified site of the coating 147 and the molding apparatus to be used is the same as in the third embodiment except for the following points.

Figure 20:
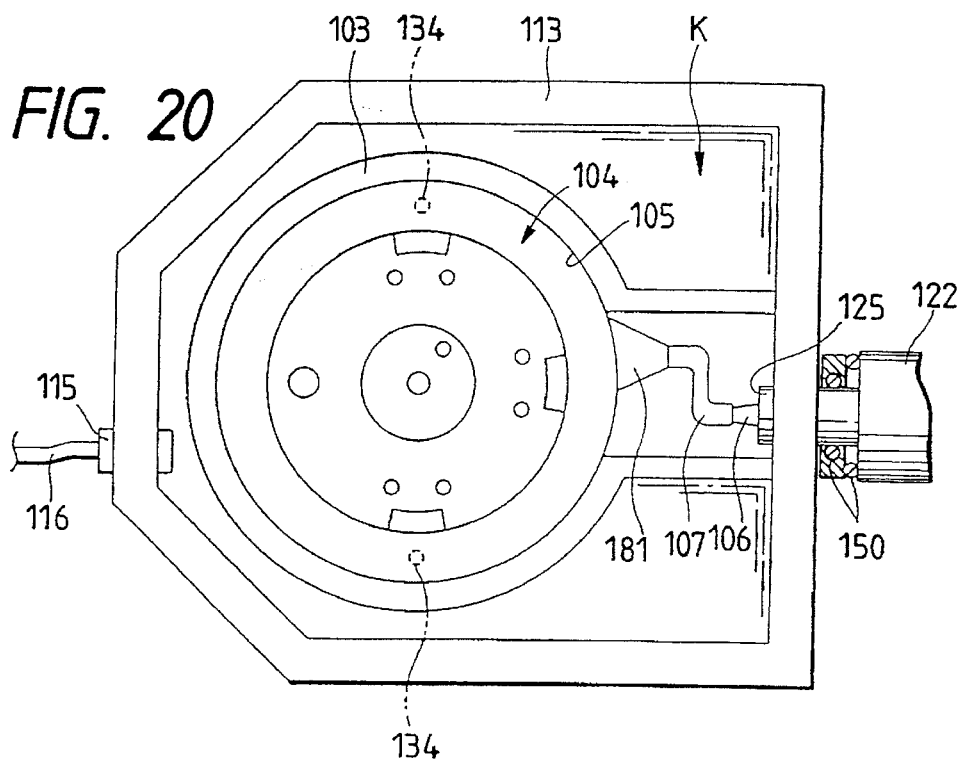
FIG. 20 is a plan view showing the lower mold used in an embodiment.

The upper mold 102 has a runner 133 extending downward from the top surface and two surface-forming gates 134 that diverge from the bottom end of the runner 133 and which are open to two diametric sites halfway in the space forming part of the cavity 104. The lower mold 103 is shown in FIG. 20, which also indicates the positions of the surface-forming gates 134 in the upper mold 102 by dashed lines. The injection nozzle 125 on the head 121 for mixing two surface-forming components penetrates a through-hole 140 formed in the top plate of the upper box 112 and is connected to the runner 133. The common gate 108 in the third embodiment is used as an interior forming gate 181 in the forth embodiment and it has nothing like the opening to the runner 120 which is formed in the third embodiment.

The method of molding a multi-property polyurethane coating by RIM according to the forth embodiment using the apparatus described above is discussed below in terms of the sequence of steps involved. Steps (1) to (3) in the third embodiment are also performed in the forth embodiment and can be omitted from the following description which is only directed to the subsequent steps.

Figure 19:
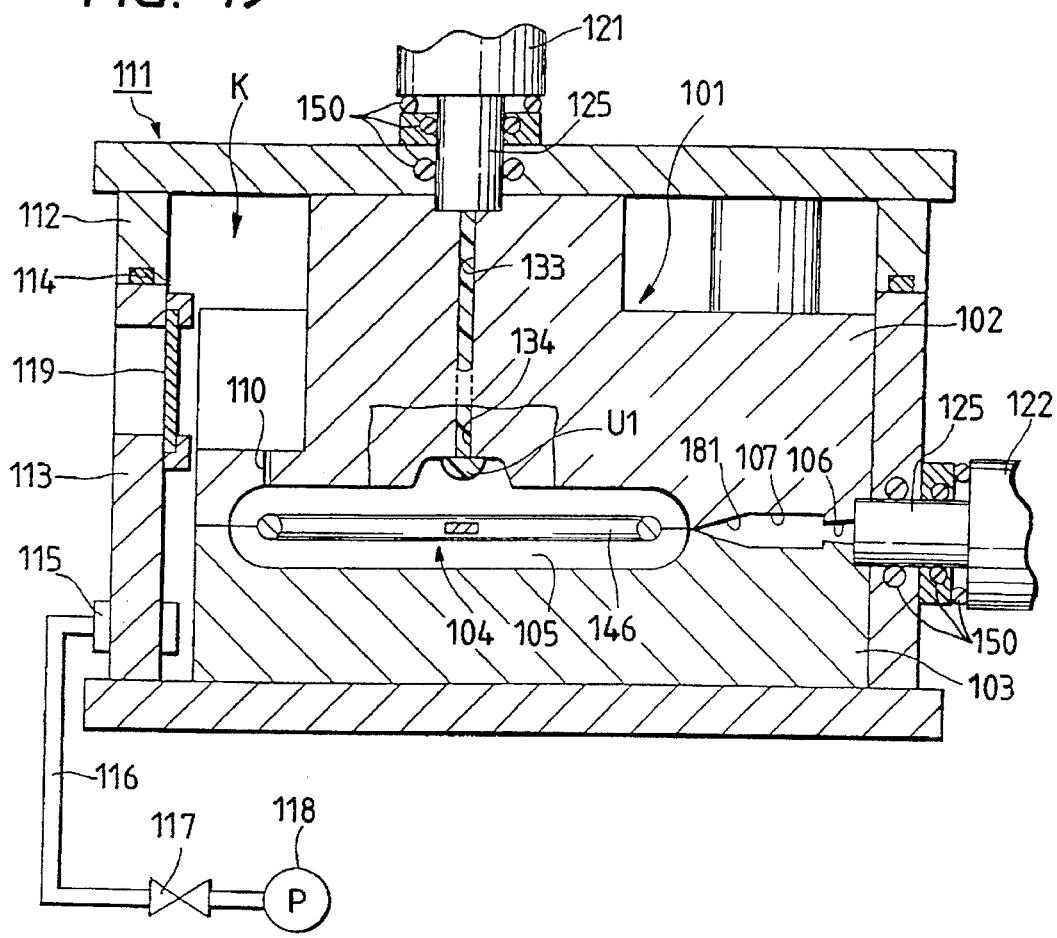
FIG. 19 is a cross-sectional view showing the step of forming the surface layer of a polyurethane coating on a steering wheel in the method of molding a two-color part in an embodiment of the invention.

(4) As in the third embodiment, the head 121 for mixing two surface-forming components is used to prepare the surface-forming RIM polyurethane material U1. As shown in FIG. 19, the material U1 is injected in a small amount into the evacuated cavity 104 from the injection nozzle 125 on the head 121 through the runner 133 and the two surface-forming gates 134.

As in the third embodiment, the injected small amount of surface-forming RIM polyurethane material U1 scatters to provide a thin-film deposit on the cavity surface 105. The difference is that in the fourth embodiment, the amount of injection of the material U1 is adjusted in such a way that it will scatter over the limited sites of the cavity surface 105 around the two surface-forming gates 134 and, hence, the surface layer 148 of the coating 147 is only molded at those sites.

Figure 21:
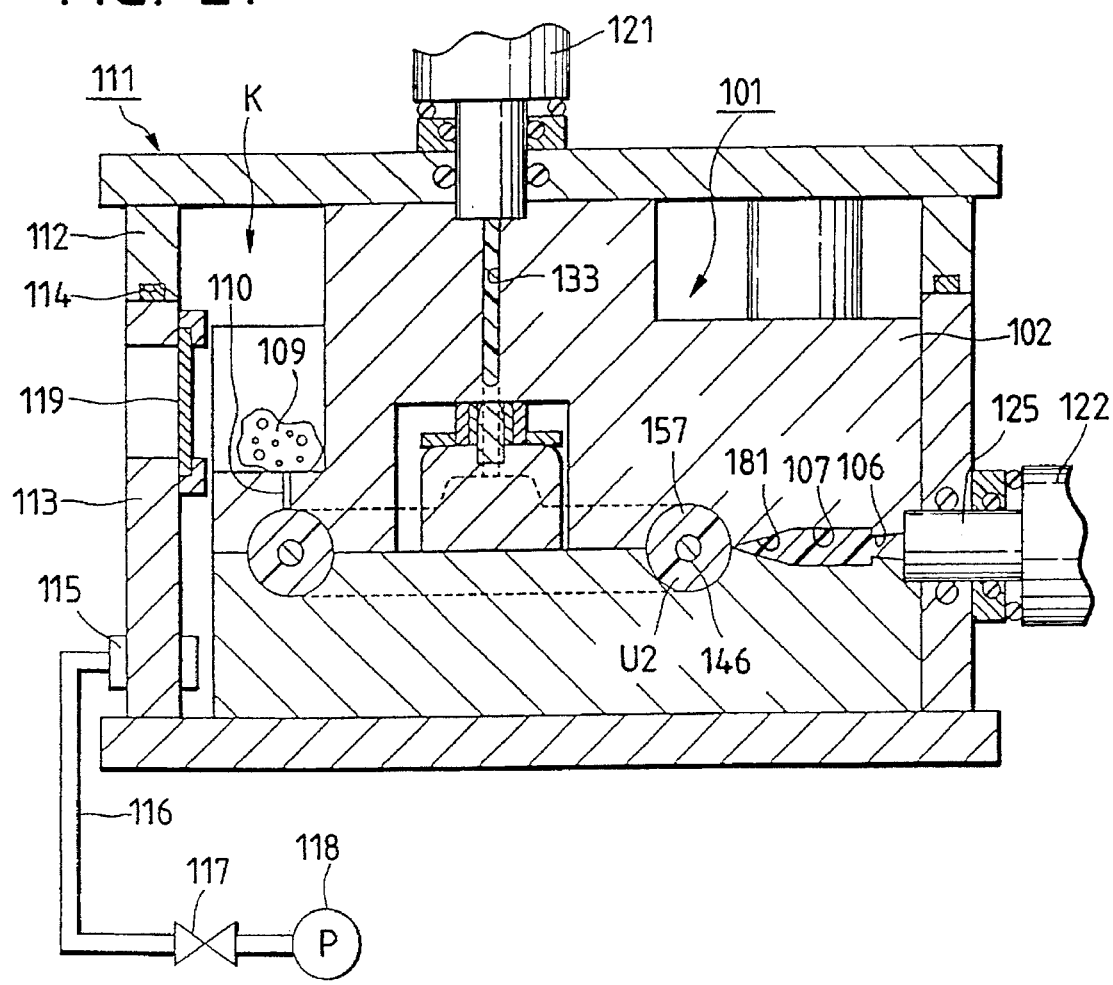
FIG. 21 is a cross-sectional view showing the step of forming the interior layer of the polyurethane coating.

(5) As in the third embodiment, the head 122 for mixing two interior-forming components is used to prepare the interior-forming RIM polyurethane material U2. However, the polyol component of the material U2 is made of a non-yellowing material and loaded with a coloring component that renders a different color than the surface-forming RIM polyurethane material U1 The material U2 is so formulated that it will produce a softer interior layer 149 than the surface layer 148 after molding. As shown in FIG. 21, the material U2 is injected into the evacuated cavity 104 from the injection nozzle 125 on the head 122 through the runner 107 and the interior-forming gate 181.

As in the third embodiment, the injected inter-forming RIM polyurethane material U2 fills the cavity 104 to form the interior layer 149 which comprises a core and a self-skin producing layer.

Figure 22:
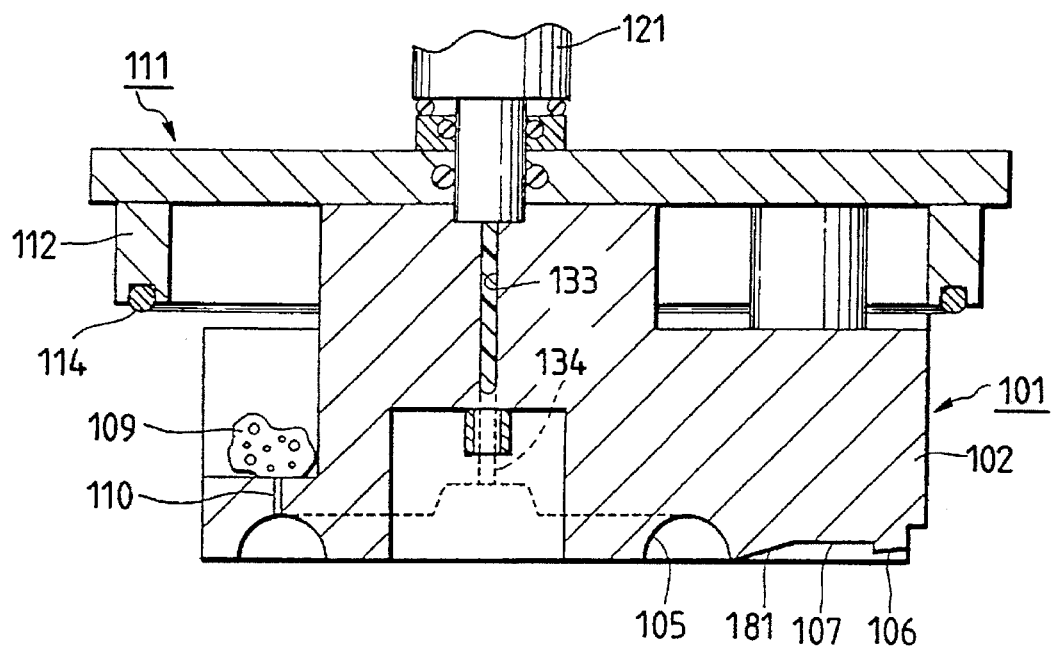
FIG. 22 is a cross-sectional view showing the step of removing the molded article from the mold.
Figure 22:
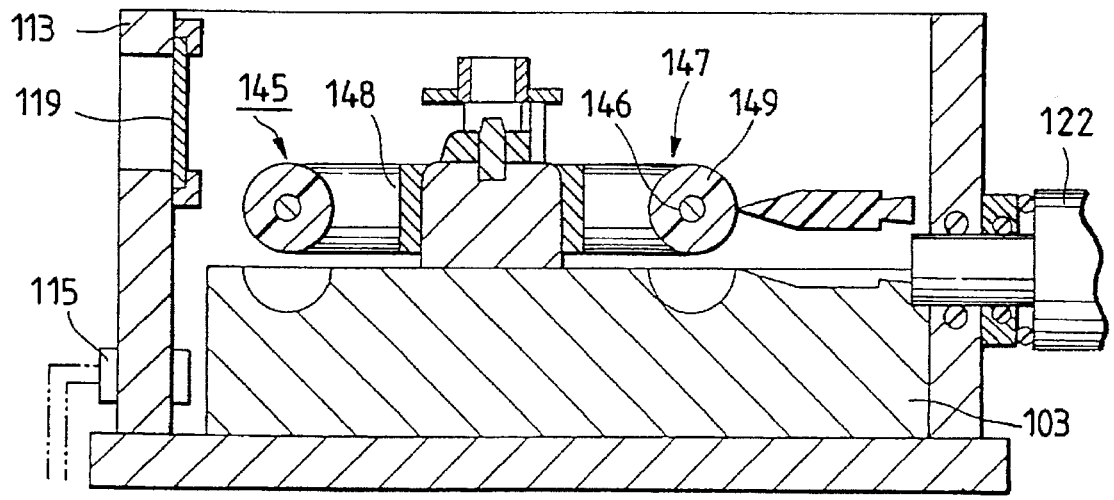

(6) As shown in FIG. 22, the mold 101 is opened and the steering wheel 145 with the polyurethane coating 147 is taken out of the mold and the blowout portion 109 is removed.

Figure 23:
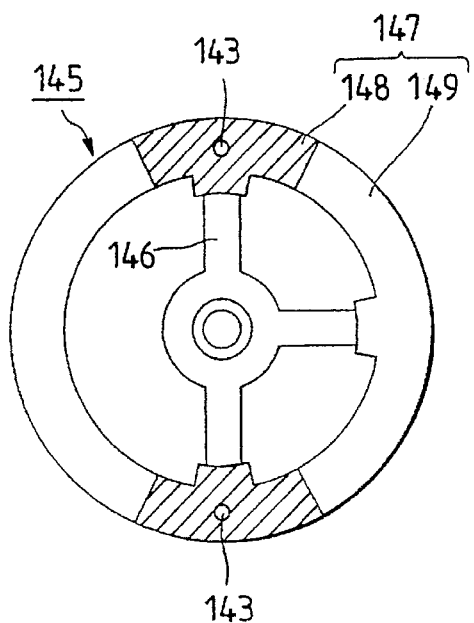
FIG. 23 is a plan view showing the back side of a steering wheel molded according to an embodiment.

The external appearance of the thus RIM molded multi-property polyurethane coating 147 is shown in FIG. 23. The surface layer 148, which is colored and which is harder than the interior layer 149, is formed only at two diametric grip sites and the interior layer 149 which is rendered a different color and which is softer than the surface layer 148 Therefore, site-dependent alterations can be made with respect to the color and other properties of the molded part. The coating 147 has vestigial marks 143 due to the surface-forming gates 134 but they are not conspicuous since they are on the back side of the steering wheel 145.

It should be noted that the present invention is in no way limited to the third and fourth embodiments described on the foregoing pages and it can be embodied with the following various design modifications without departing from the spirit of the invention:

(1) it can be embodied in the production of various multi-property RIM molded polyurethane parts such as steering wheel pads;

(2) the third embodiment can be modified in such a way that a release agent is added to the surface-forming RIM polyurethane material, thereby assuring better release of the two-color part from the mold, with the added advantage that the application of the release agent to the cavity surfaces can be omitted; and (3) the fourth embodiment can be modified in such a way that the interior-forming RIM polyurethane material is provided with a formulation that prevents or retards the formation of a self-skin producing layer, whereby asperities due to the air bubbles in the interior layer are exposed on the surface to alter its appearance and feel.

The foregoing description of preferred embodiments of the invention has been presented for purposes of illustration and description. It is not intended to be exhaustive or to limit the invention to the precise form disclosed, and modifications and variations are possible in light of the above teachings or can be acquired from practice of the invention. The embodiments were chosen and described in order to explain the principles of the invention and its practical application to enable one skilled in the art to utilize the invention in various embodiments and with various modifications as are suited to the particular use contemplated.

As described above in detail, the methods of molding multi-property polyurethane parts by RIM or the apparatus for implementing that method assures that two-color parts that have different colors, properties, etc. in the surface and interior layers are easily produced by the RIM molding of polyurethane. Furthermore, this can be accomplished using two or more inexpensive heads for mixing two components, thereby offering the desired advantage of lower equipment cost.

In addition to these advantages, the method of molding multi-property polyurethane parts by RIM or the apparatus for implementing that method assures that a surface layer that is different from the interior layer in color, properties, etc. can be selectively formed in desired sites of the molded part.

What is claimed is:

1. A method of molding a part comprising a surface layer and an interior layer, the method comprising the steps of:

reducing the pressure in a cavity of a mold;

mixing surface-forming material components in a first head to form a surface-forming material;

injecting the surface-forming material into the evacuated cavity through a gate, thereby forming the surface layer;

mixing interior-forming material components in a second head to form an interior-forming material; and injecting the interior-forming material into the evacuated cavity through the gate, thereby forming the interior layer, wherein the reduced pressure in the cavity degasses the surface-forming material and foams the interior-forming material.

2. The method according to claim 1, wherein said step of mixing surface-forming material components comprises mixing a polyol supplied from a first nozzle of the first head with an isocyanate supplied from a second nozzle of the first head, thereby forming a polyurethane surface-forming material, and wherein said step of mixing interior-forming material components comprises mixing a polyol supplied from a first nozzle of the second head with an isocyanate supplied from a second nozzle of the second head, thereby forming a polyurethane interior-forming material.

3. The method according to claim 2, wherein:

said step of supplying an isocyanate from a second nozzle of the first head comprises supplying a non-yellowing isocyanate, and said step of supplying an isocyanate from a second nozzle of the second head comprises supplying a yellowing isocyanate.

4. The method according to claim 1, wherein said step of reducing the pressure in the cavity comprises reducing the pressure to an amount such that the surface layer completely covers the interior-forming material.

5. The method according to claim 1, further comprising a step of mixing an auxiliary component with at least one related from the group consisting of the surface forming material components and the interior-forming material components.

6. An apparatus for molding a surface-forming material and an interior-forming material to obtain a molded part comprising a surface layer and an interior layer, the apparatus comprising:

a mold having a mold cavity therein and being selectively openable;

a gate in communication with said mold cavity;

a first head constructed and arranged to mix surface-forming material components therein to thereby obtain the surface-forming material, said first head communicating with the gate;

a second head constructed and arranged to mix interior-forming material components therein to thereby obtain the interior-forming material, said second head communicating with the gate; and means for reducing the pressure in said mold cavity to an extent sufficient to degas the surface-forming material and to foam the interior-forming material.

7. The apparatus according to claim 6, wherein said first head comprises two nozzles constructed and arranged to supply two different surface-forming material components to said first head and said second head comprises two nozzles constructed and arranged to supply two different interior-forming material components to said second head.

8. The apparatus according to claim 6, wherein said means for reducing the pressure comprises a vacuum pump connected to means defining a chamber enclosing said mold.

9. The apparatus according to claim 8, wherein said chamber means is constructed and arranged to be opened in substantial unison with said mold for accessing said mold cavity.

10. The apparatus according to claim 8, wherein said chamber means includes means for viewing said mold.

11. A method of molding a part comprising a surface layer and an interior layer, the method comprising the steps of:

reducing the pressure in a cavity of a mold;

mixing surface-forming material components in a first head to form a surface-forming material;

injecting the surface-forming material into the evacuated cavity through a surface-forming gate, thereby forming the surface layer;

mixing interior-forming material components in a second head to form an interior-forming material; and injecting the interior-forming material into the evacuated cavity through an interior-forming gate, thereby forming the interior layer, the interior-forming gate being at a different location than the surface-forming gate, wherein the reduced pressure in the cavity degasses the surface-forming material and foams the interior-forming material.

12. The method according to claim 11, wherein said step of mixing surface-forming material components comprises mixing a polyol supplied from a first nozzle of the first head with an isocyanate supplied from a second nozzle of the first head to obtain a polyurethane surface-forming material, and wherein said step of mixing interior-forming material components comprises mixing a polyol supplied from a first nozzle of the second head and an isocyanate supplied from a second nozzle of the second head to obtain a polyurethane interior-forming material.

13. The method according to claim 12, wherein:

said step of supplying an isocyanate from a second nozzle of the first head comprises supplying a non-yellowing isocyanate, and said step of supplying an isocyanate from a second nozzle of the second head comprises supplying a yellowing isocyanate.

14. The method according to claim 11, further comprising a step of mixing an auxiliary component with one selcted from the group consisting of the surface-forming material components and interior-forming material components.

15. The method according to claim 11, wherein said step of reducing the pressure in the mold cavity comprises reducing the pressure so as to provide a surface layer which completely covers the interior-forming material.

16. The method according to claim 11, wherein said step of reducing the pressure in the mold cavity comprises reducing the pressure so as to provide a surface layer which partially covers the interior-forming material.

17. An apparatus for molding a surface-forming material and an interior-forming material to obtain a molded part comprising a surface layer and an interior layer having different properties, the apparatus comprising:

a mold having a cavity therein and being selectively openable;

a surface-forming gate and an interior-forming gate in communication with said mold cavity at different positions, respectively;

a first head constructed and arranged to mix surface-forming material components therein to thereby obtain the surface-forming material, said first head communicating with said surface-forming gate;

a second head constructed and arranged to mix interior-forming material components therein to thereby obtain the interior-forming material, said second head communicating with said interior-forming gate; and means for reducing the pressure in said mold cavity to an extent sufficient to degas the surface-forming material and to foam the interior-foaming material.

18. The apparatus according to claim 17, wherein said first head comprises two nozzles constructed and arranged to supply two different surface-forming material components to said first head and said second head comprises two nozzles constructed and arranged to supply two different interior-forming material components to said second head.

19. The apparatus according to claim 17, wherein said means for reducing the pressure comprises a vacuum pump connected to means defining a chamber enclosing said mold.

20. The apparatus according to claim 19, wherein said chamber is constructed and arranged to be opened substantially in unison with said mold.

21. The apparatus according to claim 19, wherein said chamber means includes means for viewing said mold.

* * * * *